(12) United States Patent
Jia et al.

(10) Patent No.: US 12,373,073 B2
(45) Date of Patent: Jul. 29, 2025

(54) TOUCH DISPLAY PANEL AND TOUCH DISPLAY APPARATUS

(71) Applicant: BOE TECHNOLOGY GROUP CO., LTD., Beijing (CN)

(72) Inventors: Qian Jia, Beijing (CN); Liyan Liu, Beijing (CN); Yingtao Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/579,941

(22) PCT Filed: Aug. 15, 2022

(86) PCT No.: PCT/CN2022/112457
§ 371 (c)(1),
(2) Date: Jan. 17, 2024

(87) PCT Pub. No.: WO2024/036433
PCT Pub. Date: Feb. 22, 2024

(65) Prior Publication Data
US 2025/0077031 A1 Mar. 6, 2025

(51) Int. Cl.
*G06F 3/044* (2006.01)
(52) U.S. Cl.
CPC .......... *G06F 3/0446* (2019.05); *G06F 3/0443* (2019.05); *G06F 2203/04102* (2013.01)
(58) Field of Classification Search
CPC ....... G06F 3/0446; G06F 3/044; G06F 3/0443
USPC ......................................................... 345/173
See application file for complete search history.

(56) References Cited

U.S. PATENT DOCUMENTS

| | | | |
|---|---|---|---|
| 2017/0010725 A1 | 1/2017 | Chen et al. | |
| 2018/0113347 A1 | 4/2018 | Hara et al. | |
| 2018/0329534 A1 | 11/2018 | Hwang et al. | |
| 2020/0379602 A1 | 12/2020 | Zeng et al. | |
| 2021/0020701 A1 | 1/2021 | Zheng | |
| 2021/0026498 A1* | 1/2021 | Moy | G06F 3/0443 |
| 2022/0256092 A1* | 8/2022 | Masuda | H04N 23/671 |
| 2022/0308694 A1* | 9/2022 | Tong | G06F 3/0448 |

(Continued)

FOREIGN PATENT DOCUMENTS

| | | |
|---|---|---|
| CN | 104714706 A | 6/2015 |
| CN | 105094424 A | 11/2015 |
| CN | 110188702 A | 8/2019 |

(Continued)

*Primary Examiner* — Calvin C Ma
(74) *Attorney, Agent, or Firm* — The Webb Law Firm

(57) ABSTRACT

A touch panel display includes a display panel and a touch panel disposed on a side of the display panel. The touch panel includes a touch structure layer. The display panel includes an anode layer. The touch structure layer includes a plurality of touch lines, and the plurality of touch lines define a plurality of touch meshes. The touch display panel includes a first region and a second region, and the plurality of touch lines include a plurality of first touch lines located in the first region and a plurality of second touch lines located in the second region. A line width of at least one first touch line in the plurality of first touch lines is smaller than a line width of at least one second touch line in the plurality of second touch lines. Reflectivity of the first region is equal to reflectivity of the second region.

20 Claims, 19 Drawing Sheets

(56) References Cited

U.S. PATENT DOCUMENTS

2022/0317807 A1  10/2022  Tong et al.
2022/0359625 A1  11/2022  Yang et al.

FOREIGN PATENT DOCUMENTS

| CN | 110750177 | A | 2/2020 |
|---|---|---|---|
| CN | 111668286 | A | 9/2020 |
| CN | 111752417 | A | 10/2020 |
| CN | 113113550 | A | 7/2021 |
| CN | 114327163 | A | 4/2022 |
| WO | 2021147175 | A1 | 7/2021 |
| WO | 2021196082 | A1 | 10/2021 |

* cited by examiner

TOUCH DISPLAY PANEL AND TOUCH DISPLAY APPARATUS

CROSS-REFERENCE TO RELATED APPLICATION

This application is the United States national phase of International Patent Application No. PCT/CN2022/112457, filed Aug. 15, 2022, the disclosure of which is hereby incorporated by reference in its entirety.

BACKGROUND OF THE INVENTION

Field of the Invention

The present disclosure relates to the field of display technologies, and in particular, to a touch display panel and a touch display apparatus.

Description of Related Art

Since emergence of touch technologies, due to simplicity, rapidness, humanization and other characteristics, the touch technologies have an increasing popularity, and there are more and more products with touch functions in the market, such as mobile phones, tablet computers and notebook computers.

Based on induction principles, the touch technologies may be classified into a resistive touch technology, a capacitive touch technology, a surface acoustic wave touch technology, an optics touch technology and the like. The touch apparatus to which the capacitive touch technology is applied have broad development prospects due to high durability, long service life, support for multi-touch and other advantages.

SUMMARY OF THE INVENTION

In an aspect, a touch display panel is provided. The touch display panel includes a display panel and a touch panel disposed on a side of the display panel. The touch panel includes a touch structure layer. The display panel includes an anode layer. The touch structure layer includes a plurality of touch lines, and the plurality of touch lines define a plurality of touch meshes. The touch display panel includes a first region and a second region. The plurality of touch lines include a plurality of first touch lines located in the first region and a plurality of second touch lines located in the second region. A line width of at least one first touch line in the plurality of first touch lines is smaller than a line width of at least one second touch line in the plurality of second touch lines. Reflectivity of the first region is equal to reflectivity of the second region, and a reflectivity is a ratio of light, which is in an incident light from a side of the touch structure layer and irradiated onto the anode layer through the plurality of touch lines, and is further reflected back to the touch structure layer by the anode layer, to the incident light.

In some embodiments, the touch display panel further includes a third region, and the plurality of touch lines further include a plurality of third touch lines located in the third region. A line width of at least one third touch line in the plurality of third touch lines is larger than the line width of the at least one second touch line in the plurality of second touch lines. Reflectivity of the third region is equal to the reflectivity of the first region and the reflectivity of the second region.

In some embodiments, at least a part of touch lines in the plurality of touch lines are provided with breaks therein. A break rate of the first region is less than a break rate of the second region, and the break rate of the second region is less than a break rate of the third region. A break rate is a ratio of a number of touch lines with breaks in multiple touch lines in a region to a number of all touch lines in the region.

In some embodiments, a density of breaks in the first region is less than a density of breaks in the second region, and the density of the breaks in the second region is less than a density of breaks in the third region. And/or, a size of a break in the first region is smaller than a size of a break in the second region, and the size of the break in the second region is smaller than a size of a break in the third region.

In some embodiments, the break rate of the first region is 20%; the break rate of the second region is in a range of 23% to 27%, inclusive; and the break rate of the third region is in a range of 28% to 32%, inclusive.

In some embodiments, at least a part of touch lines in the plurality of touch lines are provided with openings therein. An opening rate of the first region is less than an opening rate of the second region, and the opening rate of the second region is less than an opening rate of the third region. An opening rate is a ratio of a number of touch lines with openings in multiple touch lines in a region to a number of all touch lines in the region.

In some embodiments, a density of openings in the first region is less than a density of openings in the second region, and the density of the openings in the second region is less than a density of openings in the third region. And/or, a size of an opening in the first region is smaller than a size of an opening in the second region, and the size of the opening in the second region is smaller than a size of an opening in the third region.

In some embodiments, the opening rate of the first region is 20%; the opening rate of the second region is in a range of 23% to 27%, inclusive; and the opening rate of the third region is in a range of 28% to 32%, inclusive.

In some embodiments, an orthogonal projection of an opening on the display panel may be in a shape of a circle, a rectangle or an ellipse.

In some embodiments, at least a part of touch lines in the plurality of touch lines are metal touch lines, and another part of touch lines are transparent conductive touch lines. A ratio of a number of transparent conductive touch lines in the first region to a number of the plurality of first touch lines is less than a ratio of a number of transparent conductive touch lines in the second region to a number of the plurality of second touch lines, and the ratio of the number of the transparent conductive touch lines in the second region to the number of the plurality of second touch lines is less than a ratio of a number of transparent conductive touch lines in the third region to a number of the plurality of third touch lines.

In some embodiments, the first region is a touch region, and the second region and the third region are a non-touch region; in the plurality of touch lines, the plurality of first touch lines located in the first region are disconnected from the plurality of second touch lines located in the second region and the plurality of third touch lines located in the third region.

In some embodiments, a break rate of the first region is 20%; a break rate of the second region in the non-touch region is in a range of 25% to 40%, inclusive; and a break rate of the third region in the non-touch region is in a range of 30% to 50%, inclusive.

In some embodiments, the touch structure layer includes a first touch structure layer and a second touch structure layer; and the touch structure layer includes a plurality of touch sub-electrodes. The first touch structure layer includes a plurality of first touch sub-electrodes and a plurality of first connection electrodes arranged in a first direction, and the plurality of first touch sub-electrodes and the plurality of first connection electrodes are alternately distributed one by one and electrically connected in sequence to constitute a first touch electrode extending in the first direction. The first touch structure layer further includes a plurality of second touch sub-electrodes arranged sequentially in a second direction. The second touch structure layer includes a plurality of second connection electrodes arranged in the second direction. The plurality of second touch sub-electrodes and the plurality of second connection electrodes are alternately distributed one by one and electrically connected in sequence to constitute a second touch electrode extending in the second direction. The first direction intersects the second direction. The plurality of first touch sub-electrodes, the plurality of first connection electrodes, the plurality of second touch sub-electrodes and the plurality of second connection electrodes are composed of the plurality of touch lines.

In some embodiments, portions of the plurality of touch lines located in a boundary region between a first touch sub-electrode and a second touch sub-electrode that are adjacent are provided with separation breaks therein, at least a part of touch lines in the plurality of touch lines are provided with breaks therein, and the breaks provided in the at least a part of touch lines in the plurality of touch lines include the separation breaks. A separation break divides a touch line to which the separation break belongs into two touch sub-lines. One of the two touch sub-lines belongs to the first touch sub-electrode, and another thereof belongs to the second touch sub-electrode, so that the first touch sub-electrode and the second touch sub-electrode that are adjacent are insulated from each other.

In some embodiments, a number of breaks, located in the boundary region between the first touch sub-electrode and the second touch sub-electrode that are adjacent, in the plurality of touch lines is greater than a number of breaks, located in a non-boundary region, in the plurality of touch lines. The non-boundary region is a region, other than the boundary region, in a region where the plurality of touch lines are located.

In some embodiments, in the plurality of touch meshes defined by the plurality of touch lines, an orthographic projection of each touch mesh on the display panel is in a shape of a hexagon. A number of breaks in each touch mesh defined by multiple touch lines located in the boundary region between the first touch sub-electrode and the second touch sub-electrode that are adjacent is 2, 3 or 4, and a number of breaks in each touch mesh defined by multiple touch lines located in the non-boundary region is 0, 1 or 2.

In some embodiments, in the plurality of touch meshes defined by the plurality of touch lines, an orthographic projection of each touch mesh on the display panel is in a shape of a quadrilateral. A number of breaks in each touch mesh defined by multiple touch lines located in the boundary region between the first touch sub-electrode and the second touch sub-electrode that are adjacent is 2 or 3, and a number of breaks in each touch mesh defined by multiple touch lines located in the non-boundary region is 0, 1 or 2.

In some embodiments, the touch display panel further includes a third region. At least a part of touch sub-electrodes in the plurality of touch sub-electrodes are metal touch sub-electrodes, and another part of touch sub-electrodes are transparent conductive touch sub-electrodes. A ratio of a number of transparent conductive touch sub-electrodes in the first region to a number of the plurality of touch sub-electrodes is less than a ratio of a number of transparent conductive touch sub-electrodes in the second region to the number of the plurality of touch sub-electrodes, and the ratio of the number of the transparent conductive touch sub-electrodes in the second region to the number of the plurality of touch sub-electrodes is less than a ratio of a number of transparent conductive touch sub-electrodes in the third region to the number of the plurality of touch sub-electrodes.

In some embodiments, multiple touch sub-electrodes in the first region are all metal touch sub-electrodes.

In another aspect, a touch display apparatus is provided. The display apparatus includes the touch display panel as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DESCRIPTION OF THE INVENTION

Figure 1A:
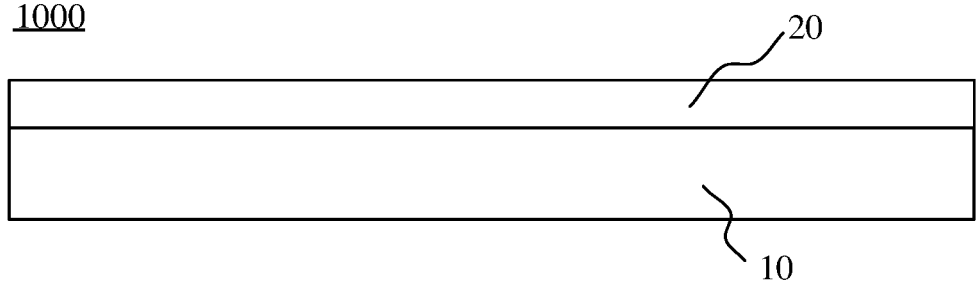
FIG. 1A is a structural diagram of a touch display apparatus, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

With the development of display technologies, flexible multiple layer on cell (FMLOC) technology is gradually applied in organic light-emitting diode (OLED) display apparatuses. FMLOC technology integrates a display structure and a touch structure together, which may meet the development trend of lightness and thinness, being foldable, and narrow bezel of the display technology.

Currently, with the emergence of flexible products, in the related art, the touch technology adopts a metal mesh structure design. The metal mesh has small resistance, small thickness, fast response speed and other advantages. Due to the consideration of a small thickness of the product and an increasing resistance and capacitance load (RC loading), a single-layer of metal mesh is designed as an FMLOC structure.

In some embodiments, as shown in FIG. 1A, a touch display apparatus 1000 includes a display panel 10 and a touch structure layer 20 that are stacked. The touch structure layer 20 is located on a side where a display surface of the display panel 10 is located. The display panel 10 includes an anode layer, and the touch structure layer 20 includes metal meshes.

Figure 1B:
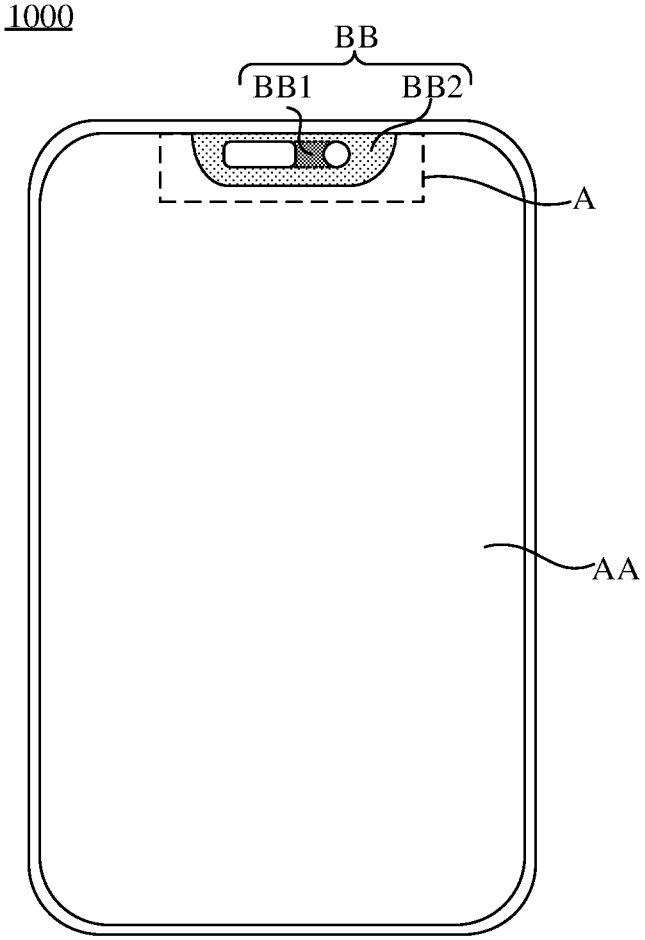
FIG. 1B is a plan view of a touch display apparatus, in accordance with some embodiments.
Figure 1C:
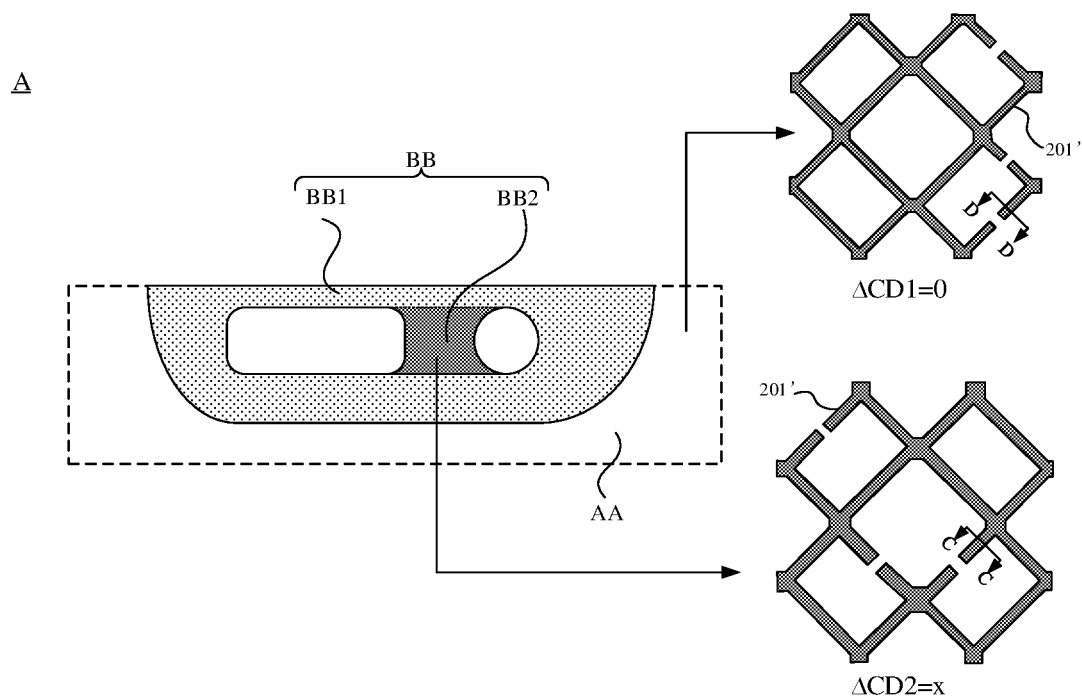
FIG. 1C is an enlarged view of a region A in FIG. 1B.

Referring to FIGS. 1B and 1C, by taking an example where the touch display apparatus 1000 is a mobile phone, a screen of the mobile phone is a notch screen. The notch screen means that there is a non-display region BB (a notch region) directly on a top of the screen, and a region other than the notch region is a display region AA. The notch region is provided therein with camera(s) and other devices, and the region needs to be provided with through hole(s) for placing the camera(s) in the through hole(s). The metal meshes used for realizing touch are distributed in the display region and non-display region. The metal mesh is composed of a plurality of metal lines 201'. For example, as shown in FIG. 1C, the plurality of metal lines surround to form a metal mesh, and the metal mesh is in a hexagonal or quadrilateral shape. Due to limitation of process conditions around a hole of the camera, there is a deviation between an actual line width of a metal line 201' located around the hole and a designed line width. A dispersion compensation design is made to avoid the line width deviation. For example, the metal line 201' has a larger line width in a region proximate to the through hole, and the metal line 201' has a smaller line width in a region far away from the through hole. As shown in FIG. 1C, the metal mesh in the display region AA dose not perform dispersion compensation design, and the compensation value ΔCD1 is 0. The metal mesh in the non-display region BB performs the dispersion compensation design, and the compensation value ΔCD2 is x. The line width of the metal mesh in the display region AA is smaller than the line width of the metal mesh in the non-display region BB.

Figure 2A:
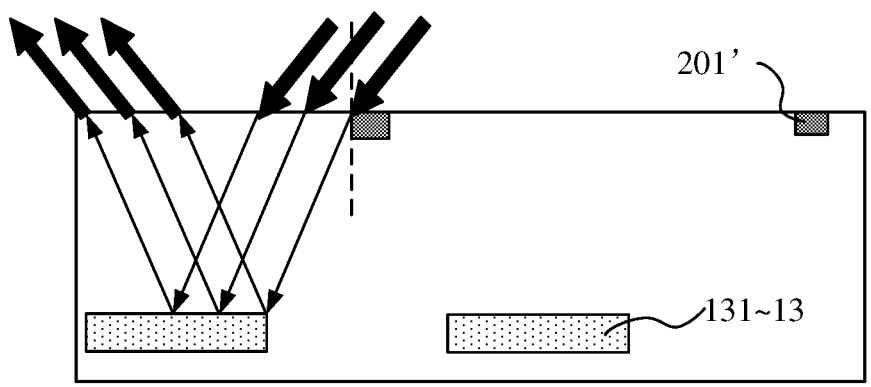
FIG. 2A is a schematic diagram of light reflection in a display region in some embodiments of the prior art.
Figure 2B:
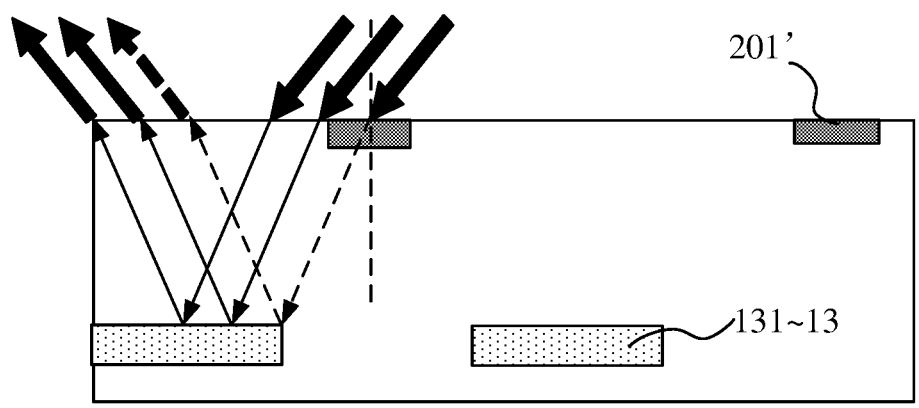
FIG. 2B is a schematic diagram of light reflection in a non-display region in some embodiments of the prior art.

However, under a dark-state strong reflected light condition, regions with dispersion compensation design and regions without dispersion compensation may have bright and dark zones and thus an optical defect of obvious boundaries. The optical defect of the obvious boundaries between the bright and dark zones is caused by different amounts of light reflected by an anode due to block of light by the metal mesh in a side view angle. When the touch display panel is illuminated from a direction of 45° to a plane where the touch display panel is located and viewed by human eyes from another direction of 45° to the plane where the touch display panel is located, the optical defect phenomenon at boundaries between the bright and dark zones may be seen. As shown in FIGS. 2A and 2B, FIG. 2A shows a reflection situation represented by a region (i.e., the display region) without optical compensation, (e.g., FIG. 2A shows a path diagram of light passing through a touch line at a DD position in FIG. 1C), and FIG. 2B shows a reflection situation represented by a region (i.e., the non-display region BB) with optical compensation (e.g., FIG. 2B shows a path diagram of light passing through a touch line at a CC position in FIG. 1C). It can be seen according to FIGS. 2A and 2B that a reflection amount in the region (i.e., the display region AA) without optical compensation is greater than that in the region (i.e., the non-display region BB) with optical compensation. This is because the metal line 201' in the region with optical compensation has a larger width and thus blocks part of light irradiated onto a anode layer from the outside, resulting in an decrease of light reflected by the anode layer. The light reflected by the anode layer in the region with a larger line width of the metal mesh is less than the light reflected by the anode layer in the region with a smaller line width of the metal mesh. Therefore, the touch display panel shows the defect of bright and dark zones, which may affects the display effect and thus affects the user experience.

In order to solve the problem, some embodiments of the present disclosure provide a touch display apparatus 1000. The touch display apparatus 1000 may be a product having a touch function and an image display function. For example, the touch display apparatus may be a display having a touch function, a television, a personal computer, a notebook computer, a billboard, a digital photo frame, a laser printer having a display function, a telephone, a mobile phone, a digital camera, an electronic picture screen, a camcorder, a viewfinder, a monitor, a navigator, a vehicle, a large-area wall, an information search device (e.g., a business search device in a department such as an electronic government, a bank, a hospital or an electric power department), a vehicle-mounted display or the like. The embodiments of the present disclosure do not limit the use of the touch display apparatus. In addition, the touch display apparatus may be a flexible touch display apparatus that is rollable or bendable, or may be a rigid touch display apparatus that is in a shape of a flat plate. As another example, the touch display apparatus 1000 may be a touch display panel 100 (also referred to as a touch display screen). As another example, the touch display apparatus 1000 may further include other electronic devices such as a touch chip and a main board in addition to the touch display panel 100. The touch chip is coupled to the touch display panel and configured to determine a touch position (e.g., touch coordinates) based on a touch signal provided by the touch display panel. The main board is coupled to the touch display panel and configured to output corresponding image data to the touch display panel based on the touch position determined by the touch chip.

The touch display panel 100 and the touch display apparatus 1000 provided by the embodiments of the present disclosure will be respectively described below.

Figure 3A:
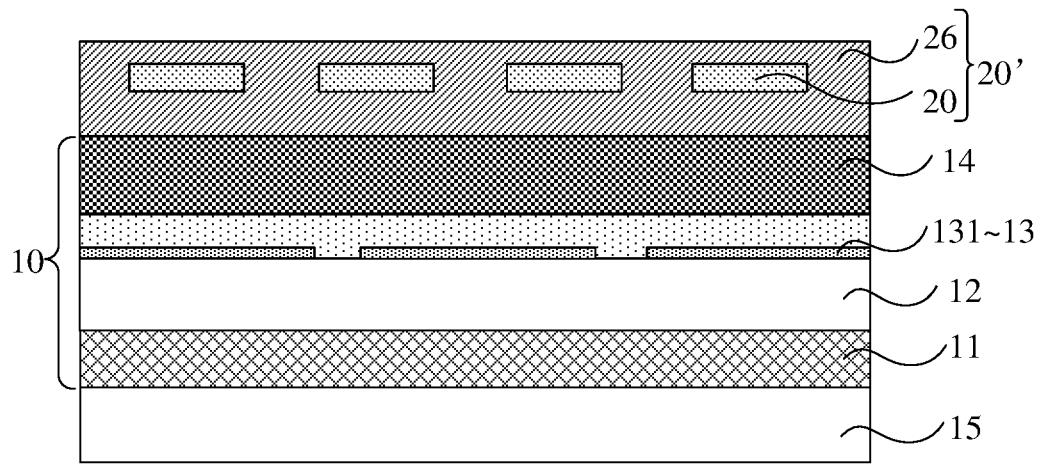
FIG. 3A is a structural diagram of a touch display panel, in accordance with some embodiments.
Figure 3B:
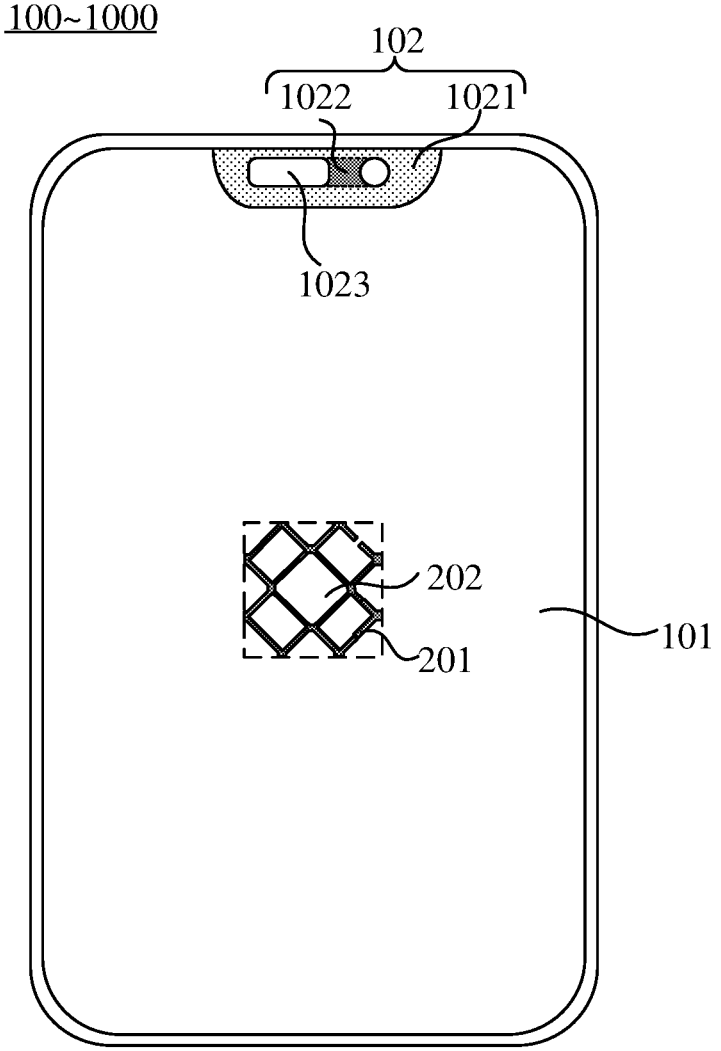
FIG. 3B is a plan view of a touch display panel, in accordance with some embodiments.
Figure 5A:
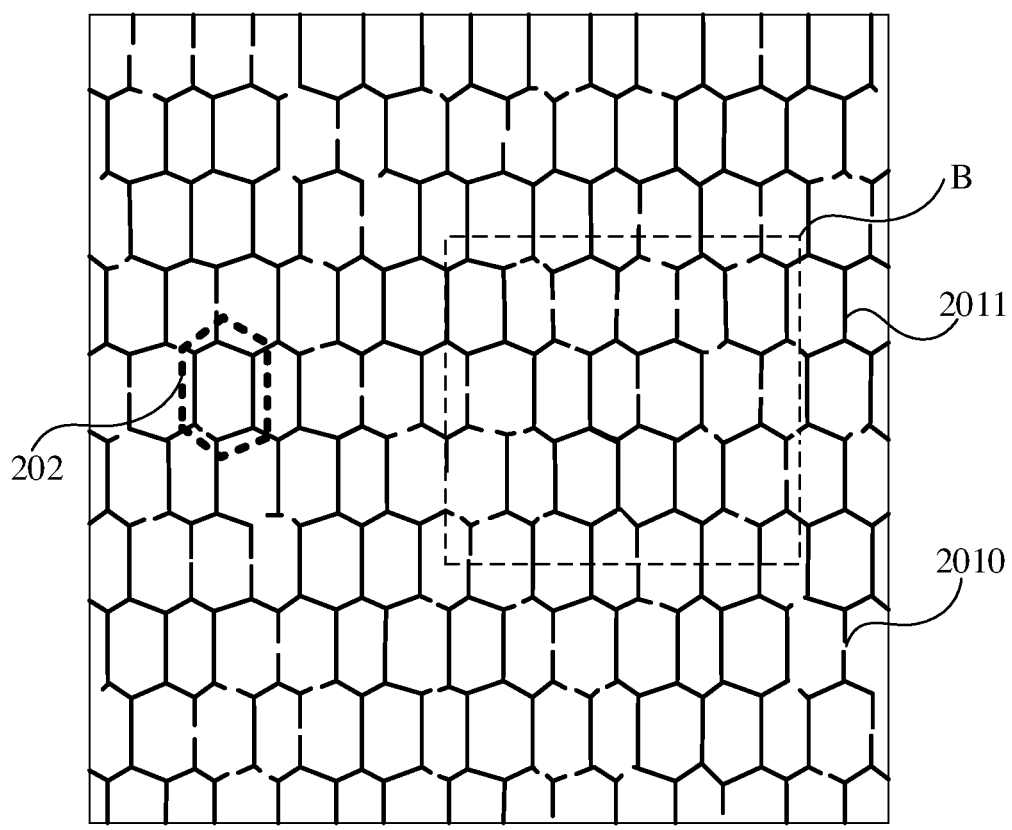
FIG. 5A is a structural diagram of a break provision of a first touch line in a first region, in accordance with some embodiments of the present disclosure.
Figure 5B:
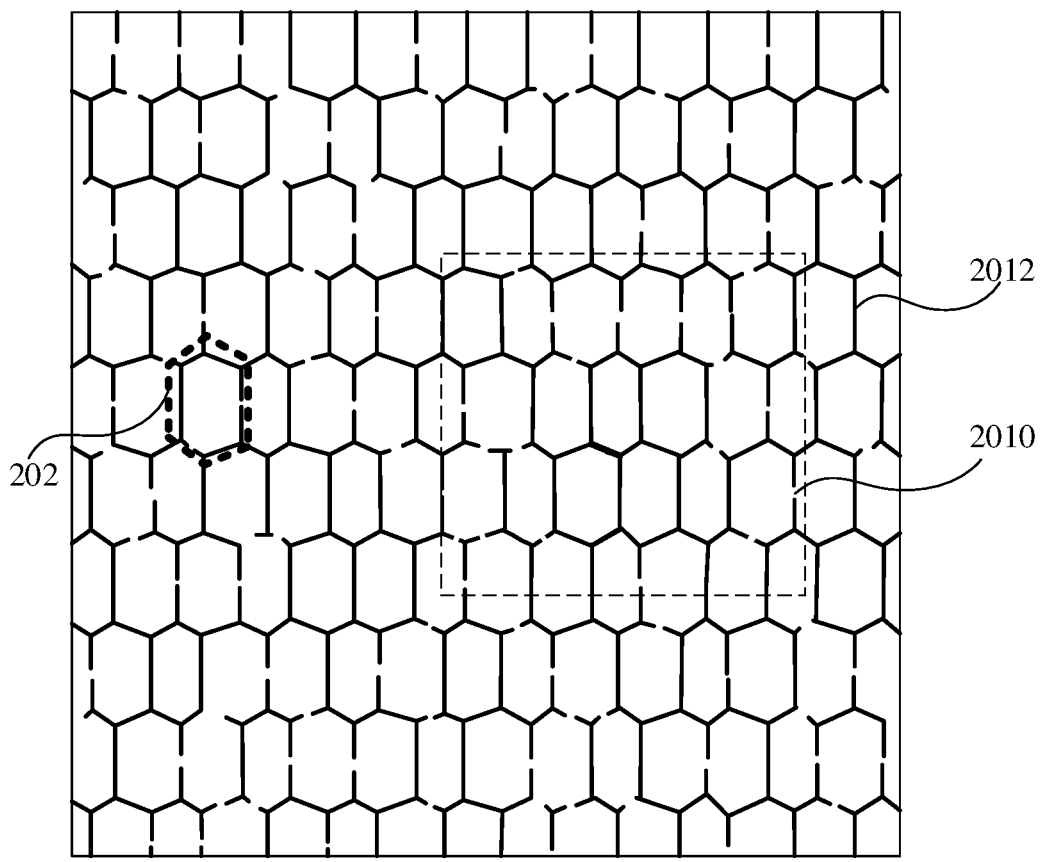
FIG. 5B is a structural diagram of a break provision of a second touch line in a second region, in accordance with some embodiments of the present disclosure.
Figure 5C:
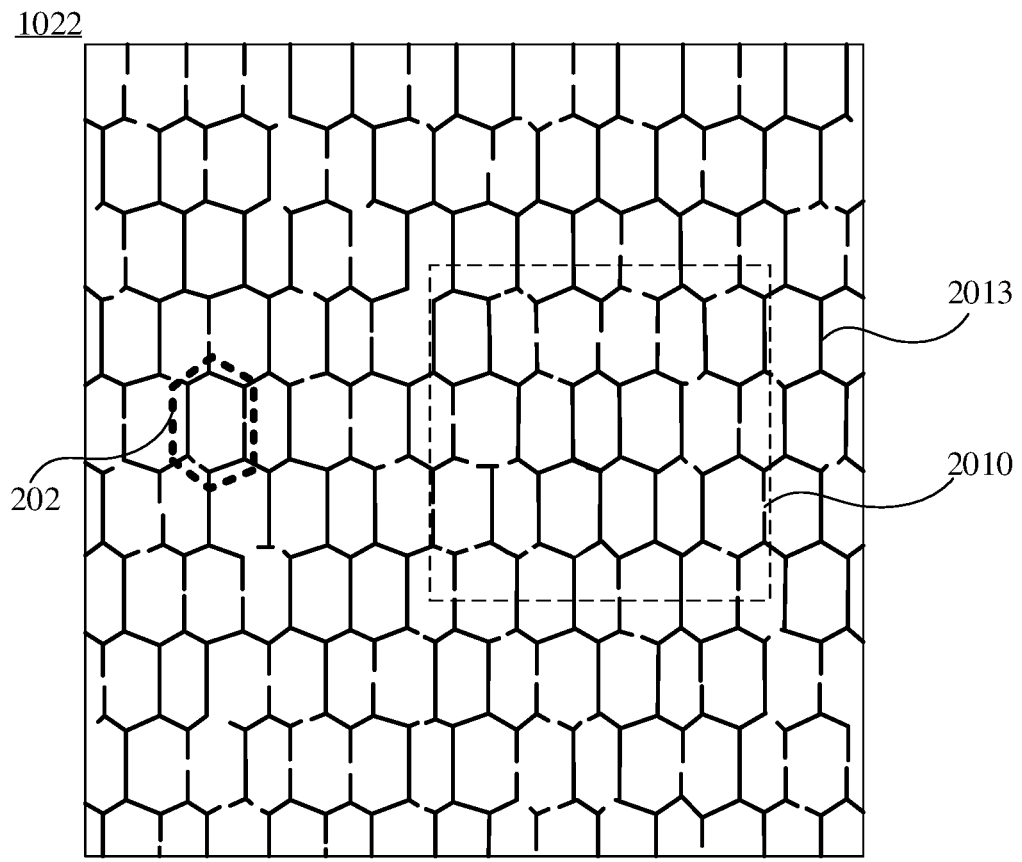
FIG. 5C is a structural diagram of a break provision of a third touch line in a third region, in accordance with some embodiments of the present disclosure.
Figure 6A:
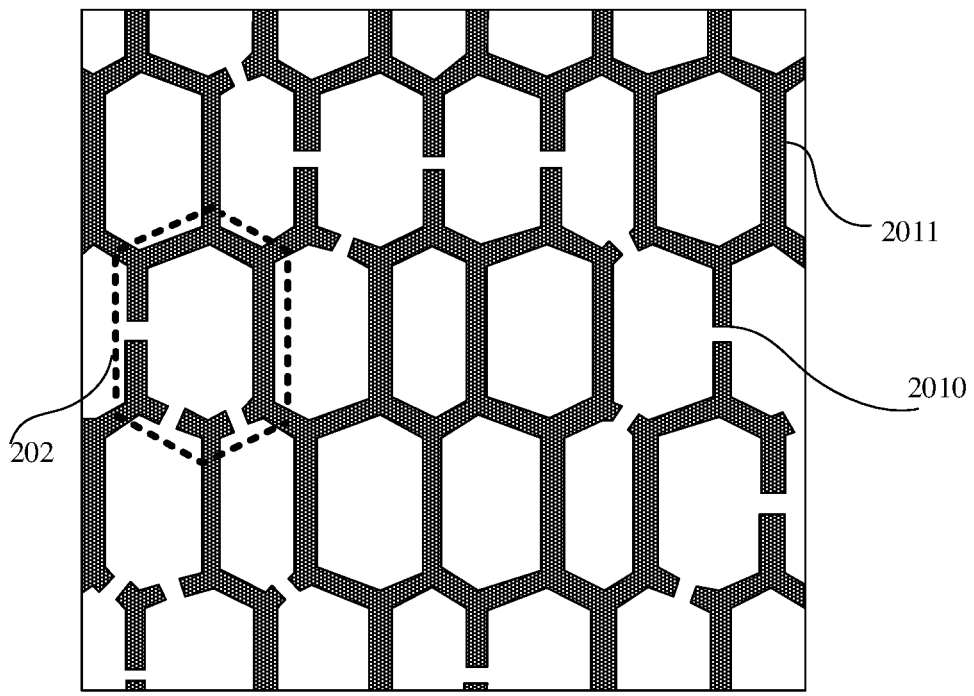
FIG. 6A is a structural diagram of an opening provision of a first touch line in a first region, in accordance with some embodiments of the present disclosure.
Figure 6B:
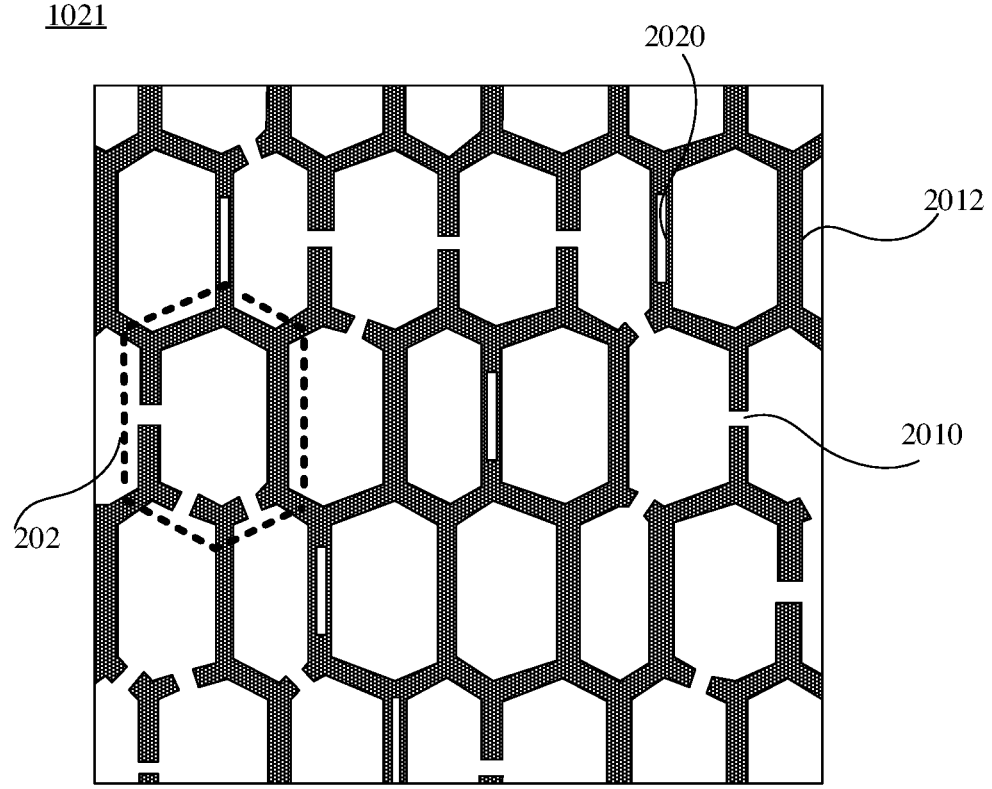
FIG. 6B is a structural diagram of an opening provision of a second touch line in a second region, in accordance with some embodiments of the present disclosure.
Figure 6C:
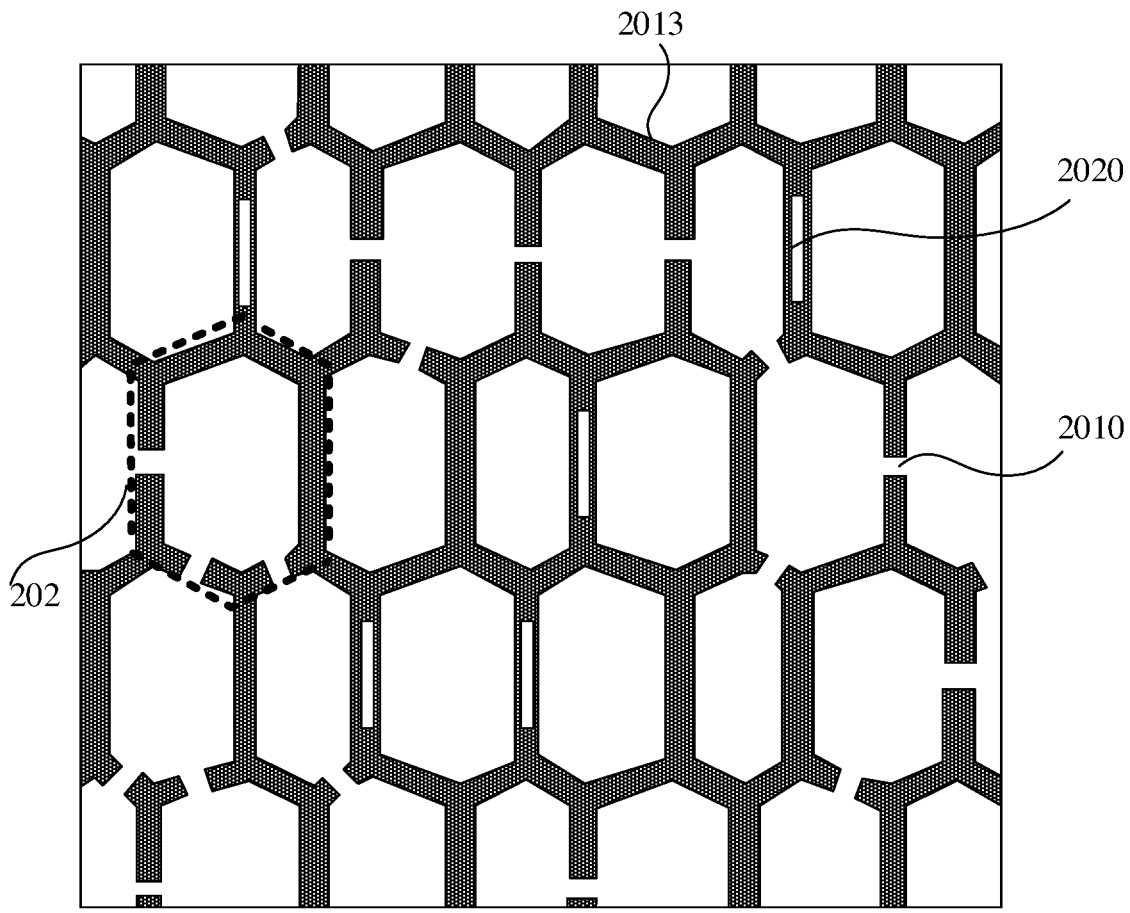
FIG. 6C is a structural diagram of an opening provision of a third touch line in a third region, in accordance with some embodiments of the present disclosure.
Figure 7A:
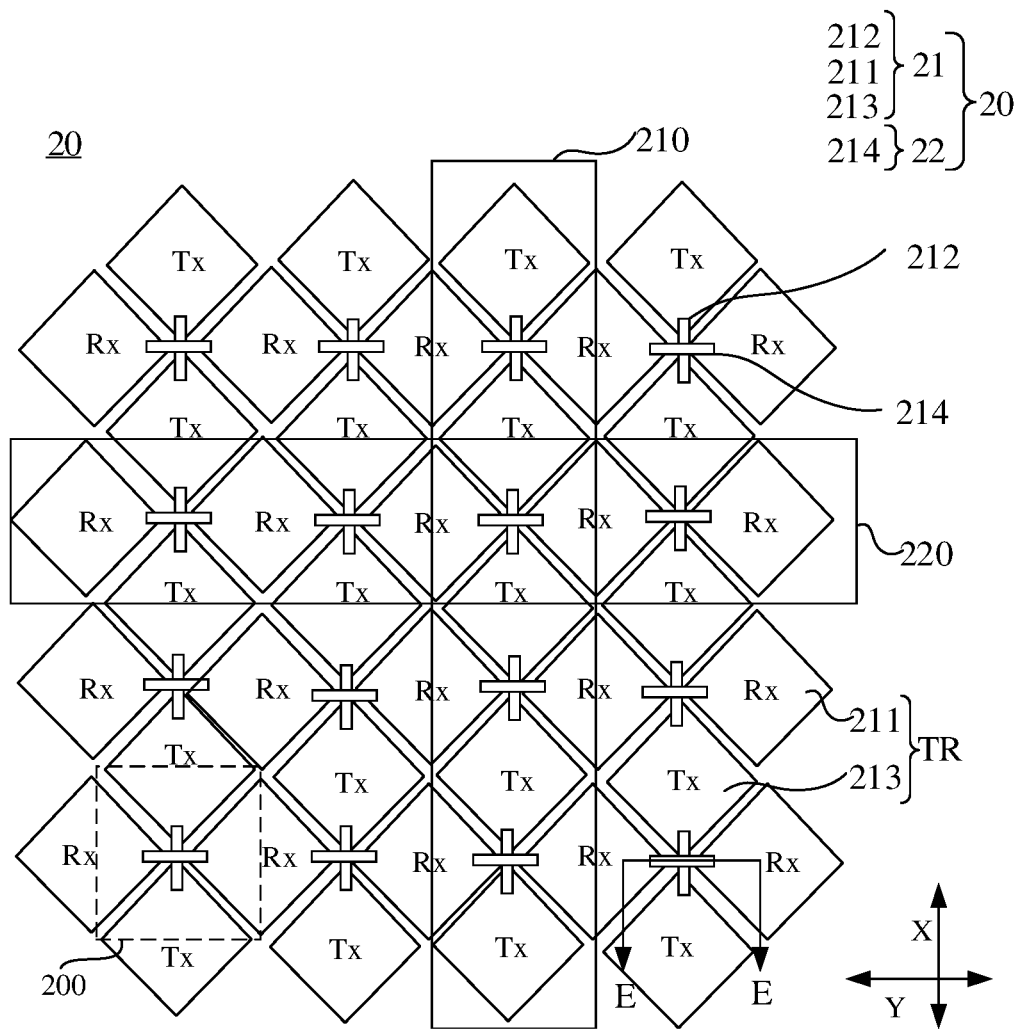
FIG. 7A is a structural diagram of a touch structure layer, in accordance with some embodiments of the present disclosure.

In the embodiments of the present disclosure, FIGS. 3A and 3B are each a structural diagram of the touch display panel 100, FIGS. 7A, 9A, 9B and 9C are each a partial enlarged view of the touch display panel 100, FIGS. 4A to 4C, 5A to 5C, 6A to 6C, and 8A and 8B are each a further enlarged view of FIGS. 7A, 9A, 9B and 9C, and FIGS. 7B and 7C are each a cross-sectional view at a EE position in FIG. 7A. In order to facilitate the description of the touch display panel 100, FIGS. 7B and 7C only illustrate schematic diagrams of the touch structure layer.

Some embodiments of the present disclosure provide a touch display panel 100. As shown in FIG. 3A, FIG. 3A is a side view of the touch display panel 100 provided by some embodiments. FIG. 3B is a top view of FIG. 3A. Referring to FIGS. 3A and 3B, the touch display panel 100 includes a display panel 10 and a touch panel 20' disposed on a side of the display panel 10. The touch panel 20' includes a touch structure layer 20, the touch structure layer 20 includes a plurality of touch lines 201, and the plurality of touch lines 201 define a plurality of touch meshes 202. It will be noted that FIG. 3B only illustrates touch lines in a local region. In fact, the touch structure layer 20 is distributed in a whole planar region of the touch display panel 100.

For example, referring to FIG. 3A, the display panel 10 is a screen with a display function, and may be coupled to the above main board and configured to receive image data sent by the main board and display corresponding images. For example, the display panel 10 may be a self-luminescent display panel, such as an organic light-emitting diode (OLED) display panel, a quantum dot light-emitting diode (QLED) display panel or a tiny-LED (including a mini light-emitting diode (mini LED) or a micro light-emitting diode (micro LED)) display panel. In a case where the display panel 10 in the touch display apparatus 1000 is a liquid crystal display panel, the touch display apparatus 1000 is a liquid crystal touch display apparatus 1000. In a case where the display panel 10 in the touch display apparatus 1000 is a self-luminescent display panel, the touch display apparatus 1000 is a self-luminescent touch display apparatus 1000.

The display panel 10 has a display surface and a non-display surface that are opposite in a thickness direction of the display panel 10. The user may face the display surface of the display panel 10 to view the images. That is, a side of the display surface of the display panel 10 away from the non-display surface is a side for the user to view, and the side is referred to as a display side of the display panel 10 below.

With continued reference to FIG. 3A, the touch structure layer 20 is configured to provide the touch signal, and the touch signal may reflect the touch position of the user on the display panel 10. The touch structure layer 20 may be coupled to the above touch chip to provide the touch signal to the touch chip.

In some possible implementations, the touch structure layer 20 may be located on the display side of the display panel 10. The touch structure layer 20 may be a component independent from the display panel 10. For example, the display panel 10 and the touch structure layer 20 are formed separately and then bonded together by an adhesive such as an optically clear adhesive (OCA). Alternatively, the touch structure layer 20 may be a structure integrated on the display panel 10. For example, the display panel 10 serves as a substrate, and the touch structure layer 20 is formed on the display surface of the display panel 10. In this case, the touch structure layer 20 and the display surface of the display panel 10 are in direct contact. For example, the display panel 10 is an OLED display panel or a QLED display panel, the display panel 10 may include a display substrate and an encapsulation layer covering the display substrate, and the touch structure layer 20 may be formed on the encapsulation layer. For example, other functional layer(s) may also be provided between the touch structure layer 20 and the display surface of the display panel 10.

In some other possible implementations, the touch structure layer 20 may be provided inside the display panel 10. For example, the display panel 10 includes a first substrate and a second substrate that are opposite, and the touch structure layer 20 may be located between the first substrate and the second substrate.

In applications of a capacitive touch technology, a plurality of film layer structures used for achieving touch sensing may be arranged in a stack to form a touch layer, and the touch layer includes a plurality of touch electrodes. The capacitive touch technology may be classified into a self-capacitance touch technology and a mutual-capacitance touch technology. In a case where the self-capacitance touch technology is applied to the touch layer, a capacitance (i.e., a self-capacitance) exists between a touch electrode and the ground. When a finger touches the touch display apparatus, a capacitance of the finger will be superimposed on the touch electrode, so that the capacitance between the touch electrode and the ground changes. Coordinates of a touch point may be determined according to change amounts, before and after the touch, in the capacitance between multiple touch electrodes and the ground, so as to achieve the touch sensing. In a case where the mutual-capacitance touch technology is applied to the touch layer, the plurality of touch electrodes may be divided into touch driving electrodes and touch sensing electrodes. The touch driving electrode may be configured to transmit a touch driving signal, touch sensing electrode may be configured to transmit a touch sensing signal, and thus a stable capacitance exists between the touch driving electrode and the touch sensing electrode. When a finger touches the touch display apparatus, the coupling between touch driving electrodes and touch sensing electrodes that are near a touch position may be affected, so that the capacitance between the two touch electrodes changes. Similarly, the coordinates of the touch point may be determined according to change amounts, before and after the touch, in the capacitance between the touch driving electrodes and the touch sensing electrodes.

For convenience of the description, the solutions of the present disclosure are illustrated below by taking an example where the mutual-capacitance touch technology is applied to the touch display apparatus, the touch layer is disposed on a side of a light exit surface of the display panel, and a film layer closest to the touch layer in the display panel serves as a substrate layer of the touch layer.

Some embodiments of the present disclosure provide a touch structure layer. The touch structure layer may be applied to the above touch display apparatus, or applied to other touch apparatuses, which is not excessively limited.

The display panel 10 may include a plurality of sub-pixels, each sub-pixel includes a pixel driving circuit and a light-emitting device that are coupled, and the pixel driving circuit is configured to drive the light-emitting device to emit light. The pixel driving circuit may include a plurality of transistors, capacitor(s) and other electronic device elements. For example, the pixel driving circuit may include three transistors and one capacitor, which constitute a 3T1C structure (i.e., one driving transistor, two switching transistors and one capacitor). Alternatively, the pixel driving circuit may include more than three transistors and at least one capacitor, such as a 4T1C structure (i.e., one driving transistor, three switching transistors and one capacitor), a 5T1C structure (i.e., one driving transistor, four switching transistors and one capacitor) or a 7T2C structure (i.e., one driving transistor, six switching transistors and two capacitors). The transistors may be thin film transistors (TFTs), metal oxide semiconductor (MOS) transistors, or other switching devices with same characteristics. The light-emitting device may be OLED or QLED.

In order to realize the above sub-pixel structure, for example, referring to FIG. 3A, the display panel 10 includes a substrate 11, a pixel driving circuit layer 12, a light-emitting device layer 13 and a first encapsulation layer 14 that are stacked in sequence. The light-emitting device layer 13 includes an anode layer 131. The first encapsulation layer 14 may be an encapsulation film or an encapsulation substrate.

The structure of the substrate 11 may be selected according to actual needs.

For example, the substrate 11 may be a rigid substrate. The rigid substrate may include, for example, a glass substrate or a polymethyl methacrylate (PMMA) substrate. In this case, the display panel 10 may be a rigid display panel.

For another example, the substrate 11 may be a flexible substrate. The flexible substrate may include, for example, a polyethylene terephthalate (PET) substrate, a polyethylene naphthalate two formic acid glycol ester (PEN) substrate, or a polyimide (PI) substrate. In this case, the display panel 10 may be a flexible display panel.

In some embodiments, the touch display panel 100 further includes a glass cover plate 15 located on a side of the display panel 10 away from the touch structure layer 20, so as to protect the display panel 10.

In some embodiments, the touch panel 20' further includes a second encapsulation layer 26. The second encapsulation layer 26 encapsulates the touch structure layer 20 to isolate the touch structure layer from the outside. The material of the second encapsulation layer 26 may be an inorganic insulating material such as nitride, oxide, oxynitride, nitrate, carbide or any combination thereof. Of course, the material of the second encapsulation layer 26 may be an organic insulating material such as acrylic, hexamethyldisilone, polyacrylate, polycarbonate or polystyrene.

Referring to FIG. 3B, FIG. 3B is a plan view of the touch display panel 100. The touch display panel 100 includes a first region 101 (a touch region) and a non-touch region 102. The first region 101 is a region of the touch display panel 100 for displaying images, and the first region 101 may also realize touch control. The first region 101 corresponds to the display region AA in FIG. 1B. The non-touch region 102 is embedded inside the first region 101. For example, in some embodiments, the touch display panel 100 is a notch screen, and there is no images displayed on the notch region. The notch region is the non-touch region 102, and the first region 101 surrounds half of the non-touch region 102. The non-touch region 102 includes a second region 1021 and through-hole regions 1023, and camera(s) and other devices are provided in the through-hole regions 1023.

Figure 4A:
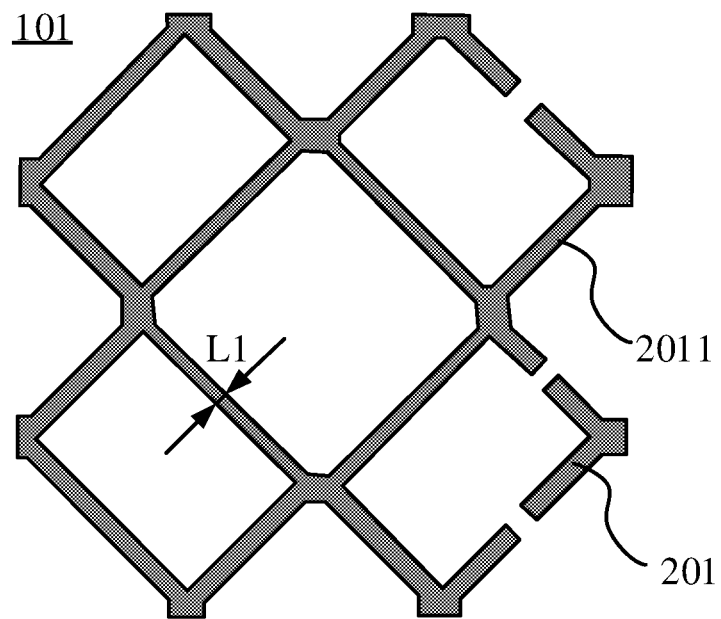
FIG. 4A is a structural diagram of a line width of a first touch line in a first region, in accordance with some embodiments of the present disclosure.
Figure 4B:
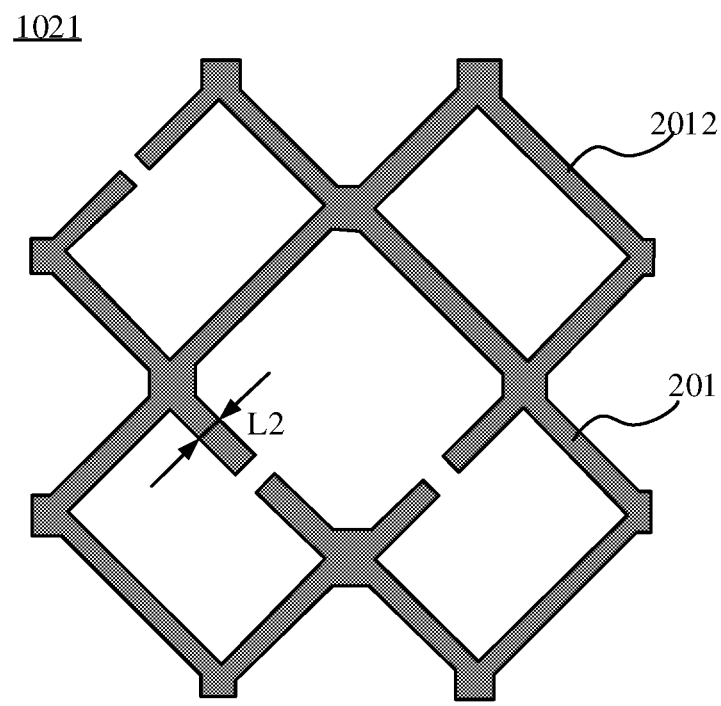
FIG. 4B is a structural diagram of a line width of a second touch line in a second region, in accordance with some embodiments of the present disclosure.

As shown in FIGS. 4A and 4B, the plurality of touch lines 201 include a plurality of first touch lines 2011 located in the first region 101 and a plurality of second touch lines 2012 located in the second region 1021. A line width of at least one first touch line 2011 in the plurality of first touch lines 2011 is smaller than a line width of at least one second touch line 2012 in the plurality of second touch lines 2012. This is because the line width of the touch line 201 may have deviation around the through-hole region 1023 due to the limitation of process conditions around the through-hole region 1023. In order to avoid the deviation of the line width of the touch line 201, an optical compensation design is made, so that the touch lines 201 close to the through-hole region 1023 in the plurality of touch lines 201 have relatively large line widths. Since the second region 1021 is closer to the through-hole region 1023 than the first region 101, the line width of the at least one first touch line 2011 in the plurality of first touch lines 2011 is smaller than the line width of the at least one second touch line 2012 in the plurality of second touch lines 2012. For details, reference is made to the previous introduction.

Figure 4C:
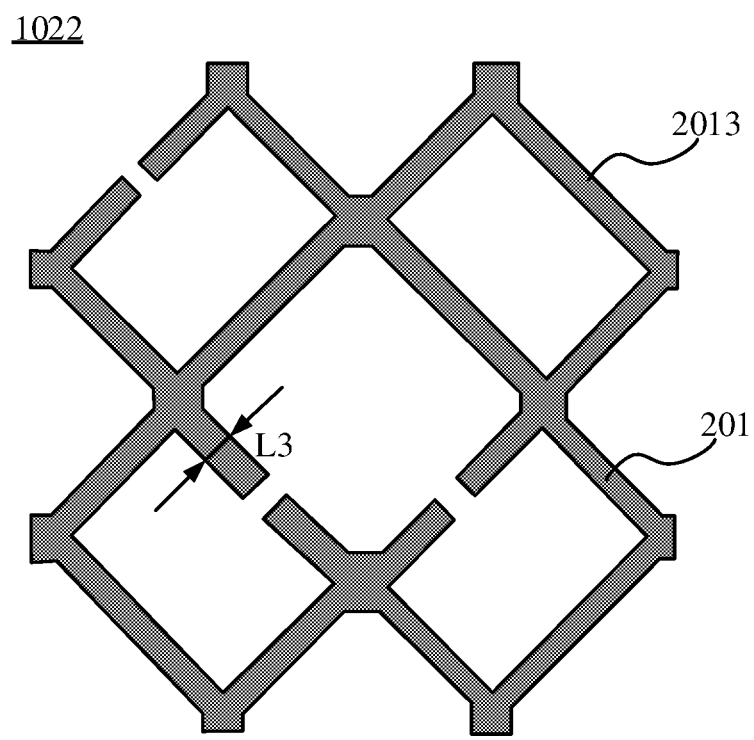
FIG. 4C is a structural diagram of a line width of a third touch line in a third region, in accordance with some embodiments of the present disclosure.

As shown in FIGS. 4A, 4B and 4C, the line width of the first touch line 2011 is L1, the line width of the second touch line 2012 is L2, and a line width of a third touch line 2013 (which will be introduced in the following contents) is L3. It can be seen from the figures that L1 is less than L2 and L2 is less than L3 (L1<L2<L3). As mentioned above, the wider the line width of the touch line 201, the more of the incident light entering from the outside blocked by the touch line 201, and the less the light reflected by the anode layer from the side view angle. Therefore, the defect of the bright and dark zones is presented, thereby affecting the display effect.

For example, the touch display panel 100 may be in a shape of a rectangle or a shape similar to the rectangle such as a rectangle with rounded corners.

In some embodiments, in the touch display panel 100 provided by the embodiments of the present disclosure, reflectivity of the first region 101 and reflectivity of the second region 1021 are equal. The reflectivity is a ratio of light, which is in the incident light from a side of the touch structure layer 20 and irradiated onto the anode layer 131 through multiple touch lines 201 and further reflected back to the touch structure layer 20 by the anode layer 131, to the incident light. The schematic diagram of the light path may refer to FIGS. 2A and 2B.

It can be understood that in a case where the reflectivity of the first region 101 and the reflectivity of the second region 1021 are equal, the reflection amounts are also the same. Therefore, even if the line widths of the touch lines 201 in different regions of the entire touch display panel 100 are different, since the reflectivity of the first region 101 and the reflectivity of the second region 1021 are set to be equal (that is, the ratios of lights, in the incident light irradiated onto the anode layer 131 through multiple touch lines 201 and further reflected back to the touch structure layer 20 by the anode layer 131, to the incident light are equal), the display image of the touch display panel 100 will not show the defect of the bright and dark zones, the risk of visualization of the reflective structure may be reduced and the display effect of the touch display panel 100 may be improved.

In some embodiments, referring to FIG. 3B, the touch display panel 100 further includes a third region 1022.

The third region 1022 is a part of the non-touch region 102. The non-touch region 102 includes two through-hole regions 1023, and the third region 1022 is located between the two through-hole regions 1023 of the non-touch region 102. The region of the non-touch region 102 other than the through-hole regions 1023 and the third region 1022 is the second region 1021.

As shown in FIG. 4C, the plurality of touch lines 201 further include a plurality of third touch lines 2013 located in the third region 1022. A line width of at least one third touch line 2013 in the plurality of third touch lines 2013 is larger than the line width of the at least one second touch line 2012 in the plurality of second touch lines 2012.

It can be seen in combination with the above introduction and FIGS. 4A and 4B that the line width of the at least one first touch line 2011 in the plurality of first touch lines 2011 is smaller than the line width of the at least one second touch line 2012 in the plurality of second touch lines 2012, and the line width of the at least one second touch line 2012 in the plurality of second touch lines 2012 is smaller than the line width of the at least one third touch line 2013 in the plurality of third touch lines 2013. This is because the line width of the touch line 201 may have deviation around the through-hole region 1023 due to the limitation of process conditions around the through-hole region 1023. In order to avoid the deviation of the line width of the touch line 201, an optical compensation design is made, so that the touch lines 201 close to the through-hole region 1023 in the plurality of touch lines 201 have relatively large line widths. Since the third region 1022 is closer to the through-hole region 1023 than the first region 101 and the second region 1021, the line width of the at least one first touch line 2011 in the plurality of first touch lines 2011 is smaller than the line width of the at least one second touch line 2012 in the plurality of second touch lines 2012, and the line width of the at least one second touch line 2012 in the plurality of second touch lines 2012 is smaller than the line width of the at least one third touch line 2013 in the plurality of third touch lines 2013. For details, reference is made to the previous introduction.

In some embodiments, reflectivity of the third region 1022 is equal to the reflectivity of the first region 101 and the reflectivity of the second region 1021. It can be understood that in a case where the reflectivity of the first region 101, the reflectivity of the second region 1021 and the reflectivity of the third region 1022 are equal, the reflection amounts are also the same. Therefore, even if the line widths of the touch lines 201 in different regions of the entire touch display panel 100 are different, since the reflectivity of the first region 101, the reflectivity of the second region 1021 and the reflectivity of the third region 1022 are equal (that is, the ratios of lights, in the incident light irradiated onto the anode layer 131 through multiple touch lines 201 and further reflected back to the touch structure layer 20 by the anode layer 131, to the incident light are equal), the display image of the touch display panel 100 will not show the defect of the bright and dark zones, the risk of visualization of the reflective structure may be reduced and the display effect of the touch display panel 100 may be improved.

Several embodiments for making the reflectivity of the first region 101, the second region 1021 and the third region 1022 of the touch display panel 100 equal are introduced below.

In an implementation, referring to FIGS. 5A, 5B and 5C, FIGS. 5A, 5B and 5C respectively illustrate structural diagrams of arrangement of touch lines in the first region 101, the second region 1021 and the third region 1022. At least a part of touch lines 201 in the plurality of touch lines 201 are provided with breaks 2010 therein. A touch line 201 being provided with a break 2010 therein means that the touch line 201 is disconnected at the break 2010, that is, a portion of the touch line 201 is missing at the break 2010. At the break 2010, the light incident from the outside is not blocked, and the light may pass through the break 2010 to be incident on the anode layer 131, thereby improving the reflectivity of the light.

Figure 5D:
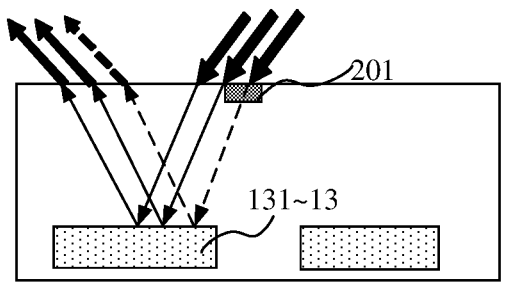
FIG. 5D is a schematic diagram of light reflection at a non-break position of a touch line.
Figure 5E:
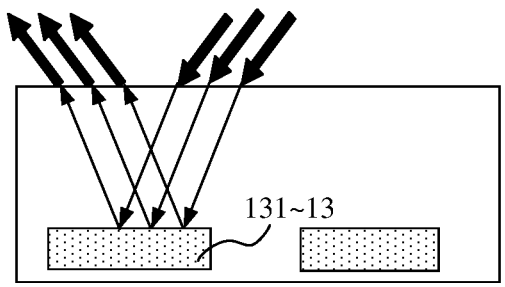
FIG. 5E is a schematic diagram of light reflection at a break position of a touch line.

As shown in FIGS. 5D and 5E, FIG. 5D shows a schematic diagram of the path of the light at a position where the touch line 201 is not provided with a break 2010, and FIG. 5E shows a schematic diagram of the path of the light at a position where the touch line 201 is provided with a break 2010. It can be seen that at the break 2010, the light incident from the outside is not blocked, and the light may pass through the break 2010 to be incident on the anode layer 131, thereby improving the reflectivity of the light.

In some embodiments, a break rate of the first region 101 is less than a break rate of the second region 1021, and the break rate of the second region 1021 is less than a break rate of the third region 1022. The break rate is a ratio of the number of touch lines 201 with breaks 2010 in multiple touch lines 201 in a region to the number of all touch lines 201 in the region. Referring to FIGS. 4A, 4B and 4C, the relationship of the line widths of the touch lines 201 in the first region 101, the second region 1021 and the third region 1022 is (L1<L2<L3), that is, the third touch line 2013 has the widest line width, and block the most light. Therefore, the relationship of the break rates of the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, with continued reference to FIGS. 5A, 5B and 5C, a density of the breaks 2010 in the first region 101 is less than a density of the breaks 2010 in the second region 1021, and the density of the breaks 2010 in the second region 1021 is less than a density of the breaks 2010 in the third region 1022.

It will be noted that the density of the breaks 2010 reflects a dense degree of the breaks 2010 in each region or the number of the breaks 2010 in each region. The density of the breaks 2010 in the first region 101 is set to be less than the density of the breaks 2010 in the second region 1021, and the density of the breaks 2010 in the second region 1021 is set to be less than the density of the breaks 2010 in the third region 1022. It can be understood as that the arrangement of the breaks 2010 in the first region 101 is sparser than the arrangement of the breaks 2010 in the second region 1021, and the arrangement of the breaks 2010 in the second region 1021 is sparser than the arrangement of the breaks 2010 in the third region 1022. Similarly, it can also be understood as that the number of the breaks 2010 in the first region 101 is less than the number of the breaks 2010 in the second region 1021, and the number of the breaks 2010 in the second region 1021 is less than the number of the breaks 2010 in the third region 1022. Therefore, the relationship of the densities of the breaks 2010 in the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some other embodiments, a size of the break 2010 in the first region 101 is smaller than a size of the break 2010 in the second region 1021, and the size of the break 2010 in the second region 1021 is smaller than a size of the break 2010 in the third region 1022.

It will be noted that the size of the break 2010 reflects a size of an area of the break 2010. The size of the break 2010 in the first region 101 is smaller than the size of the break 2010 in the second region 1021, and the size of the break 2010 in the second region 1021 is smaller than the size of the break 2010 in the third region 1022. It can be understood as that a size of an area of the break 2010 in the first region 101 is smaller than a size of an area of the break 2010 in the second region 1021, and the size of the area of the break 2010 in the second region 1021 is smaller than a size of an area of the break 2010 in the third region 1022. Therefore, the relationship of the sizes of the areas of the breaks 2010 in the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, the arrangement of the breaks 2010 in the first region 101, the second region 1021 and the third region 1022 may be a combination of the above two embodiments. That is, the density of the breaks 2010 in the first region 101 is less than the density of the breaks 2010 in the second region 1021, and the density of the breaks 2010 in the second region 1021 is less than the density of the breaks 2010 in the third region 1022; moreover, the size of the break 2010 in the first region 101 is smaller than the size of the break 2010 in the second region 1021, and the size of the break 2010 in the second region 1021 is smaller than the size of the break 2010 in the third region 1022. For example, with the combination of the above two embodiments, the relationship of the density and the size of the area of the breaks 2010 in the first region 101, the second region 1021 and the third region 1022 are set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, the break rate of the first region 101 is 20%, the break rate of the second region 1021 is in a range of 23% to 27%, inclusive, and the break rate of the third region 1022 is in a range of 28% to 32%, inclusive.

For example, the break rate of the first region 101 is 20%, the break rate of the second region 1021 is 23%, and the break rate of the third region 1022 is 28%. For another example, the break rate of the first region 101 is 20%, the break rate of the second region 1021 is 25%, and the break rate of the third region 1022 is 30%. For yet another example, the break rate of the first region 101 is 20%, and the break rate of the second region 1021 is 27%, and the break rate of the third region 1022 is 32%. The different break rates are set for different regions, the break rate of the first region 101 is less than the break rate of the second region 1021, and the break rate of the second region 1021 is less than the break rate of the third region 1022. Such setting may allow more incident light from the side of the touch structure layer 20 to pass through multiple breaks 2010 of multiple touch lines 201 and irradiate onto the anode layer 131, and further be reflected by the anode layer 131 to the touch structure layer 20, so as to enhance the reflectivity. Different break rates may change the reflectivity. In a case where the break rates corresponding to different regions in the above example are adopted, the reflectivity of the first region 101, the reflectivity of the second region 1021 and the reflectivity of the third region 1022 may be equal, and ultimately the problem of the optical defect in the regions may be improved.

In another implementation, as shown in FIGS. 6A, 6B and 6C, FIGS. 6A, 6B and 6C respectively represent structure diagrams of the touch lines in the first region 101, the second region 1021 and the third region 1022. At least a part of touch lines 201 in the plurality of touch lines 201 are provided with openings 2020 therein. The opening 2020 is a hole provided in the touch line 201, that is, a portion of the touch line 201 is missing at the opening 2020. At the opening 2020, the light incident from the outside is not blocked, and the light may pass through the opening 2020 to be incident on the anode layer 131, thereby improving the reflectivity of the light.

The difference between the opening 2020 and the break 2010 is that the touch line 201 provided with the opening 2020 is still connected, while the touch line 201 provided with the break 2010 is disconnected and divided into two. Both designs can increase the incidence rate of the incident light from the outside and entering the anode layer 131.

Figure 6D:
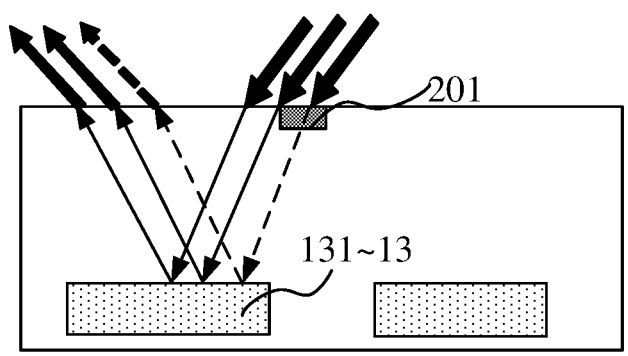
FIG. 6D is a schematic diagram of light reflection at a non-opening position of a touch line, in accordance with some embodiments of the present disclosure.
Figure 6E:
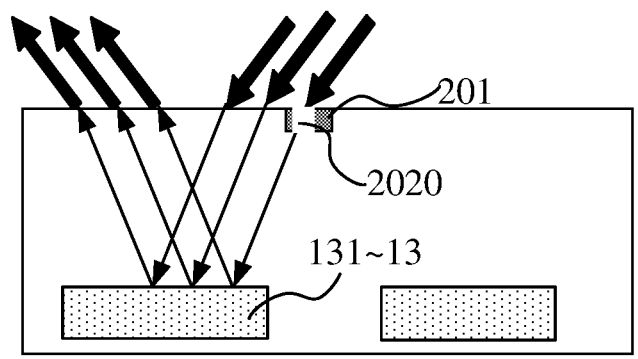
FIG. 6E is a schematic diagram of light reflection at an opening position of a touch line, in accordance with some embodiments of the present disclosure.

As shown in FIGS. 6D and 6E, FIG. 6D shows a schematic diagram of the path of light at a position where the touch line 201 is not provided with an opening 2020, and FIG. 6E shows a schematic diagram of the path of the light at a position where the touch line 201 is provided with an opening 2020. It can be seen that at the opening 2020, the light incident from the outside is not blocked, and the light may pass through the opening 2020 to be incident on the anode layer 131, thereby improving the reflectivity of the light.

In some embodiments, an opening rate of the first region 101 is less than an opening rate of the second region 1021, and the opening rate of the second region 1021 is less than an opening rate of the third region 1022. The opening rate is a ratio of the number of touch lines 201 with openings 2020 in multiple touch lines 201 in a region to the number of all touch lines 201 in the region. Referring to FIGS. 4A, 4B and 4C, the relationship of the line widths of the touch lines 201 in the first region 101, the second region 1021 and the third region 1022 is (L1<L2<L3), that is, the third touch line 2013 has the widest line width, and block the most light. Therefore, the relationship of the opening rates of the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, a density of the openings 2020 in the first region 101 is less than a density of the openings 2020 in the second region 1021, and the density of the openings 2020 in the second region 1021 is less than a density of the openings 2020 in the third region 1022.

It will be noted that the density of the openings 2020 reflects a dense degree of the openings 2020 in each region or the number of the openings 2020 in each region. The density of the openings 2020 in the first region 101 is set to be less than the density of the openings 2020 in the second region 1021, and the density of the openings 2020 in the second region 1021 is set to be less than the density of the openings 2020 in the third region 1022. It can be understood as that the arrangement of the openings 2020 in the first region 101 is sparser than the arrangement of the openings 2020 in the second region 1021, and the arrangement of the openings 2020 in the second region 1021 is sparser than the arrangement of the openings 2020 in the third region 1022. Similarly, it can also be understood as that the number of the openings 2020 in the first region 101 is less than the number of the openings 2020 in the second region 1021, and the number of the openings 2020 in the second region 1021 is less than the number of the openings 2020 in the third region 1022. Therefore, the relationship of the densities of the openings 2020 in the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some other embodiments, a size of the opening 2020 in the first region 101 is smaller than a size of the opening 2020 in the second region 1021, and the size of the opening 2020 in the second region 1021 is smaller than a size of the opening 2020 in the third region 1022.

It will be noted that the size of the opening 2020 reflects a size of an area of the opening 2020. The size of the opening 2020 in the first region 101 is smaller than the size of the opening 2020 in the second region 1021, and the size of the opening 2020 in the second region 1021 is smaller than the size of the opening 2020 in the third region 1022. It can be understood as that a size of an area of the opening 2020 in the first region 101 is smaller than a size of an area of the opening 2020 in the second region 1021, and the size of the area of the opening 2020 in the second region 1021 is smaller than a size of an area of the opening 2020 in the third region 1022. Therefore, the relationship of the sizes of the areas of the openings 2020 in the first region 101, the second region 1021 and the third region 1022 may be set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, the arrangement of the openings 2020 in the first region 101, the second region 1021 and the third region 1022 may be a combination of the above two embodiments. That is, the density of the openings 2020 in the first region 101 is less than the density of the openings 2020 in the second region 1021, and the density of the openings 2020 in the second region 1021 is less than the density of the openings 2020 in the third region 1022; moreover, the size of the opening 2020 in the first region 101 is smaller than the size of the opening 2020 in the second region 1021, and the size of the opening 2020 in the second region 1021 is smaller than the size of the opening 2020 in the third region 1022. For example, with the combination of the above two embodiments, the relationship of the density and the size of the area of the openings 2020 in the first region 101, the second region 1021 and the third region 1022 are set as above to ensure that the reflectivity of the first region 101, the reflectivity of the second region 1021 and the reflectivity of the third region 1022 are equal. Thus, the display image of the touch display panel 100 will not show the defect of the bright and dark zones, the risk of visualization of the reflective structure may be reduced and the display effect of the touch display panel 100 may be improved.

In some embodiments, the opening rate of the first region 101 is 20%, the opening rate of the second region 1021 is in a range of 23% to 27%, inclusive, and the opening rate of the third region 1022 is in a range of 28% to 32%, inclusive.

For example, the opening rate of the first region 101 is 20%, the opening rate of the second region 1021 is 23%, and the opening rate of the third region 1022 is 28%. For another example, the opening rate of the first region 101 is 20%, the opening rate of the second region 1021 is 25%, and the opening rate of the third region 1022 is 30%. For yet another example, the opening rate of the first region 101 is 20%, the opening rate of the second region 1021 is 27%, and the opening rate of the third region 1022 is 32%. The different opening rates are set for different regions, the opening rate of the first region 101 is less than the opening rate of the second region 1021, and the opening rate of the second region 1021 is less than the opening rate of the third region 1022. Such setting may allow more incident light from the side of the touch structure layer 20 to pass through multiple openings 2020 of multiple touch lines 201 and irradiate onto the anode layer 131, and further be reflected by the anode layer 131 to the touch structure layer 20, so as to enhance the reflectivity. Different opening rates may change the reflectivity. In a case where the opening rates corresponding to different regions in the above example are adopted, the reflectivity of the first region 101, the reflectivity of the second region 1021 and the reflectivity of the third region 1022 may be equal, and ultimately the problem of the optical defect in the regions may be improved.

In some embodiments, an orthogonal projection of the opening 2020 on the display panel 10 may be in a shape of a circle, a rectangle or an ellipse.

For example, orthogonal projections of the openings 2020 on the display panel 10 are in shapes of circles, rectangles and ellipses, and the shape is not limited here. The maximum sizes of the openings 2020 provided in the first region 101, the second region 1021 and the third region 1022 are respectively smaller than the line widths of the first touch line 2011, the second touch line 2012 and the third touch line 2013.

In yet another implementation, as shown in FIGS. 6A to 6C, at least a part of touch lines 201 in the plurality of touch lines 201 are provided with openings 2020 therein, and at least another part of touch lines 201 are provided with breaks 2010 therein. The break rate of the first region 101 is less than the break rate of the second region 1021, and the break rate of the second region 1021 is less than the break rate of the third region 1022; and/or the opening rate of the first region 101 is less than the opening rate of the second region 1021, and the opening rate of the second region 1021 is less than the opening rate of the third region 1022. For example, a sum of the break rate and the opening rate of the first region 101 is less than a sum of the break rate and the opening rate of the second region 1021, and the sum of the break rate and the opening rate of the second region 1021 is less than a sum of the break rate and the opening rate of the third region 1022. In each region, there is no limit on the density and size of the breaks 2010 and the density and size of the openings 2020, as long as the reflectivity of the first region 101, the reflectivity of the second region 1021 and the reflectivity of the third region 1022 are equal.

Figure 6F:
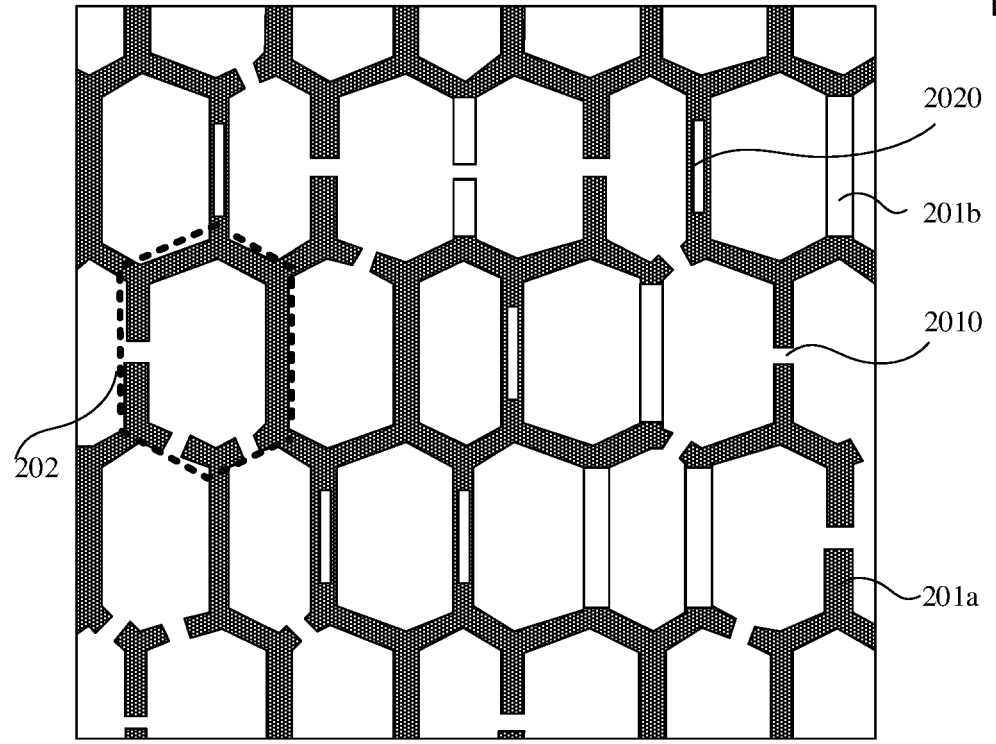
FIG. 6F is a material schematic diagram of touch lines, in accordance with some embodiments of the present disclosure.

In yet another implementation, as shown in FIG. 6F, at least a part of touch lines 201 in the plurality of touch lines 201 are metal touch lines 201a, and the other part of touch lines 201 are transparent conductive touch lines 201b. In FIG. 6F, the touch line without pattern filling serves as the transparent conductive touch line 201b, and the touch line with pattern filling serves as the metal touch line 201a. A ratio of the number of the transparent conductive touch lines 201b in the first region 101 to the number of the plurality of first touch lines 2011 is less than a ratio of the number of the transparent conductive touch lines 201b in the second region 1021 to the number of the plurality of second touch lines 2012, and the ratio of the number of the transparent conductive touch lines 201b in the second region 1021 to the number of the plurality of second touch lines 2012 is less than a ratio of the number of the transparent conductive touch lines 201b in the third region 1022 to the number of the plurality of third touch lines 2013.

In the above embodiments, the transmittance of the transparent conductive touch line 201b is higher than that of the metal touch line 201a. Therefore, in a region, the lager the ratio of the number of the transparent conductive touch lines 201b to the number of touch lines 201 in the region, the higher the overall transmittance of the region. The transmittance is a ratio of an incident amount of light, passing through multiple touch lines 201 to be irradiated onto the anode layer, in the incident light from the side of the touch structure layer 20 in a region to a total incident amount.

In some examples, the material of the metal touch line 201a is an magnesium aluminum (MgAl) alloy, a lithium aluminum (LiAl) alloy or other alloys, or magnesium (Mg), aluminum (Al), lithium (Li) or silver (Ag), and the material of the transparent conductive touch line 201b is indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) or carbon nanotubes.

For example, the transmittance of the first region 101 is less than the transmittance of the second region 1021, and the transmittance of the second region 1021 is less than the transmittance of the third region 1022. The ratio of the materials of the touch lines 201 are set to change the transmittance of each region, so as to enhance the reflectivity. As a result, the reflectivity of the first region 101, the reflectivity of the second region 1021 and the reflectivity of the third region 1022 are equal, and ultimately the problem of the optical defect in the regions may be improved, thereby enhancing the display effect of the touch display panel 100.

As shown in FIG. 6F, in an implementation, at least a part of touch lines 201 in the plurality of touch lines 201 are provided with openings 2020 therein, and at least another part of touch lines 201 are provided with breaks 2010 therein. In addition, at least a part of touch lines 201 in the plurality of touch lines 201 are metal touch lines 201a, and the other part of touch lines 201 are transparent conductive touch lines 201b. That is to say, the touch line 201 provided with the opening 2020, the touch line 201 provided with the break 2010, and the touch lines 201 with different materials may be freely combined in various ways, as long as the reflectivity of the first region 101, the reflectivity of the second region 1021 and the reflectivity of the third region 1022 are equal.

In some embodiments, the first region 101 is the touch region, and the second region 1021 and the third region 1022 are the non-touch region. In the plurality of touch lines 201, touch lines 201 located in the first region 101 are disconnected from touch lines 201 located in the second region 1021 and the third region 1022. That is, the plurality of first touch lines located in the first region 101 are disconnected from the plurality of second touch lines located in the second region 1021 and the plurality of third touch lines located in the third region 1022.

For example, the first region 101 is a region of the touch display panel 100 used for displaying images, and can achieve touch control. The non-touch region 102 is not used for displaying images, and does not require a touch function. There may be no electrical connection between the first region 101 and the non-touch region 102, that is, the two are electrical insulated. Therefore, when the plurality of touch lines 201 located in the first region 101 and the non-touch region 102 are provided, multiple touch lines 201 at the boundary between the first region 101 and the non-touch region 102 may be disconnected, so that the density of breaks in the plurality of touch lines may further increase.

In some embodiments, in a case where the touch lines 201 located in the first region 101 and the touch lines 201 located in the second region 1021 and the third region 1022 are disconnected, the break rate of the first region 101 is 20%, the break rate of the second region 1021 in the non-touch region 102 is in a range of 25% to 40%, inclusive, and the break rate of the third region 1022 in the non-touch region 102 is in a range of 30% to 50%, inclusive.

For example, the break rate of the first region 101 is 20%, the break rate of the second region 1021 is 25%, and the break rate of the third region 1022 is 30%. For another example, the break rate of the first region 101 is 20%, the break rate of the second region 1021 is 30%, and the break rate of the third region 1022 is 40%. For yet another example, the break rate of the first region 101 is 20%, the break rate of the second region 1021 is 40%, and the break rate of the third region 1022 is 50%. Since the multiple touch lines 201 at the boundary between the first region 101 and the non-touch region 102 may be disconnected, different regions correspond to different break rates. The break rate of the first region 101 is less than the break rate of the second region 1021, and the break rate of the second region 1021 is less than the break rate of the third region 1022. Such setting may allow more incident light from the side of the touch structure layer 20 to pass through multiple breaks 2010 of multiple touch lines 201 and irradiate onto the anode layer 131, and further be reflected by the anode layer 131 to the touch structure layer 20, so as to enhance the reflectivity. Different break rates may change the reflectivity. In a case where the break rates corresponding to different regions in the above example are adopted, the reflectivity of the first region 101, the reflectivity of the second region 1021 and the reflectivity of the third region 1022 may be equal, and ultimately the problem of the optical defect in the regions may be improved, thereby improving the display effect of the touch display panel 100.

In some embodiments, as shown in FIG. 7A, the touch structure layer 20 includes a first touch structure layer 21 and a second touch structure layer 22. The relative positions of the first touch structure layer 21 and the second touch structure layer 22 may be interchanged. For example, the first touch structure layer 21 is located on a side of the second touch structure layer 22 away from the display panel; alternatively, the first touch structure layer 21 is located on a side of the second touch structure layer 22 proximate to the display panel. FIG. 7A illustrates the second case. The touch structure layer 20 includes a plurality of touch sub-electrodes TR. The first touch structure layer 21 includes a plurality of first touch sub-electrodes 213 and a plurality of first connection electrodes 212 arranged in a first direction X, and the plurality of first touch sub-electrodes 213 and the plurality of first connection electrodes 212 are alternately distributed one by one and electrically connected in sequence to form a first touch electrode 210 extending in the first direction X. The first touch structure layer 21 further includes a plurality of second touch sub-electrodes 211 arranged sequentially and at equal intervals in a second direction Y. The second touch structure layer 22 includes a plurality of second connection electrodes 214 arranged in the second direction Y, and the plurality of second touch sub-electrodes 211 and the plurality of second connection electrodes 214 are alternately distributed one by one and electrically connected in sequence to form a second touch electrode 220 extending in the second direction Y. The first direction X intersects the second direction Y. The plurality of first touch sub-electrodes 213, the plurality of first connection electrodes 212, the plurality of second touch sub-electrodes 211 and the plurality of second connection electrodes 214 are composed of the plurality of touch lines 201.

For example, FIG. 7A shows a structural diagram of the touch structure layer 20 provided by at least one embodiment of the present disclosure. As shown in FIG. 7A, the touch structure layer 20 includes a plurality of first touch electrodes 210 extending in the first direction X and a plurality of second touch electrodes 220 extending in the second direction Y. For example, in FIG. 7A, the first touch electrodes 210 are touch sensing electrodes Tx, and the second touch electrodes 220 are touch driving electrodes Rx. The embodiments of the present disclosure are not limited thereto. In other examples, the first touch electrodes 210 may be touch driving electrodes, and the second touch electrodes 220 may be touch sensing electrodes.

In some embodiments, each first touch electrode 210 includes first touch sub-electrodes 213 that are sequentially arranged in the first direction X and connected to each other, and each second touch electrode 220 includes second touch sub-electrodes 211 that are sequentially arranged in the second direction Y and connected to each other. For example, as shown in FIG. 7A, main outlines of each first touch sub-electrode 213 and each second touch sub-electrode 211 are both in shapes of rhombuses. In other examples, the first touch sub-electrode 213 and the second touch sub-electrode 211 may be in other shapes, such as triangles or strips, and the shapes are not limited here.

First touch sub-electrodes 213 adjacent in the first direction X are electrically connected by first connection electrodes 212 to form the first touch electrode 210, and second touch sub-electrodes 211 adjacent in the second direction Y are electrically connected by second connection electrodes 214 to form the second touch electrode 220.

Figure 7B:
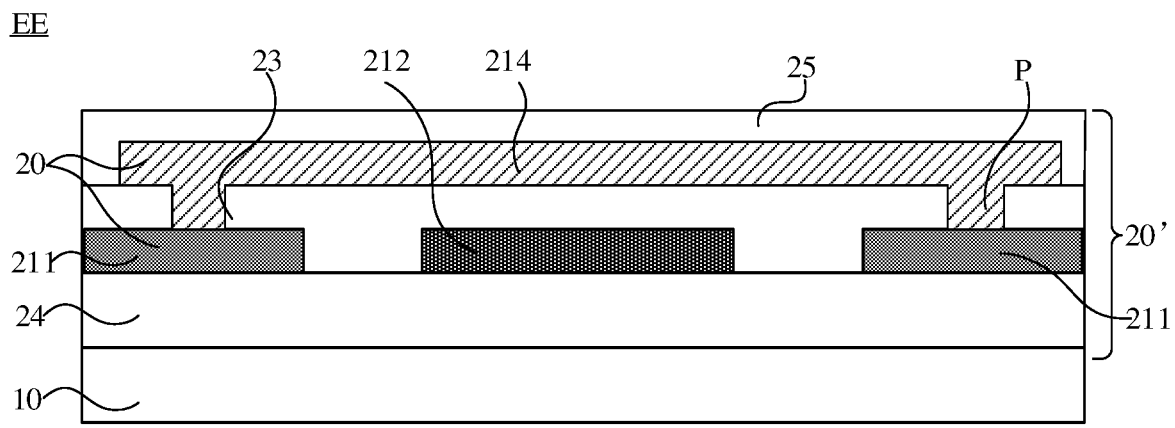
FIG. 7B is a sectional view of FIG. 7A at an EE position.

In some embodiments, the plurality of second connection electrodes 214 and the plurality of second touch sub-electrodes 211 are provided in different layers. Optionally, the relative position relationship of the plurality of second connection electrodes 214 and the plurality of second touch sub-electrodes 211 may have two cases. As shown in FIG. 7B, the plurality of second connection electrodes 214 are located on a side of the plurality of second touch sub-electrodes 211 away from the display panel 10. Alternatively, as shown in FIG. 7C, the plurality of second connection electrodes 214 may be located on a side of the plurality of second touch sub-electrodes 211 proximate to the display panel 10.

Referring to FIG. 7B, FIG. 7B is a cross-sectional view of FIG. 7A at an EE position. FIG. 7B shows an embodiment in which the second connection electrodes 214 are located on the side of the second touch sub-electrodes 211 away from the display panel 10. Two ends of the second connection electrode 214 may each be electrically connected to the second touch sub-electrode 211 through at least one via hole P.

For example, two ends of the second connection electrode 214 may each be electrically connected to the second touch sub-electrode 211 through two via holes P, which may improve reliability of the electrical connection between the second connection electrode 214 and the second touch sub-electrode 211, and reduce the equivalent resistance of the second connection electrode 214 and the second touch sub-electrode 211, thereby reducing the power consumption of the touch display panel and improving the display and touch effects.

Figure 7C:
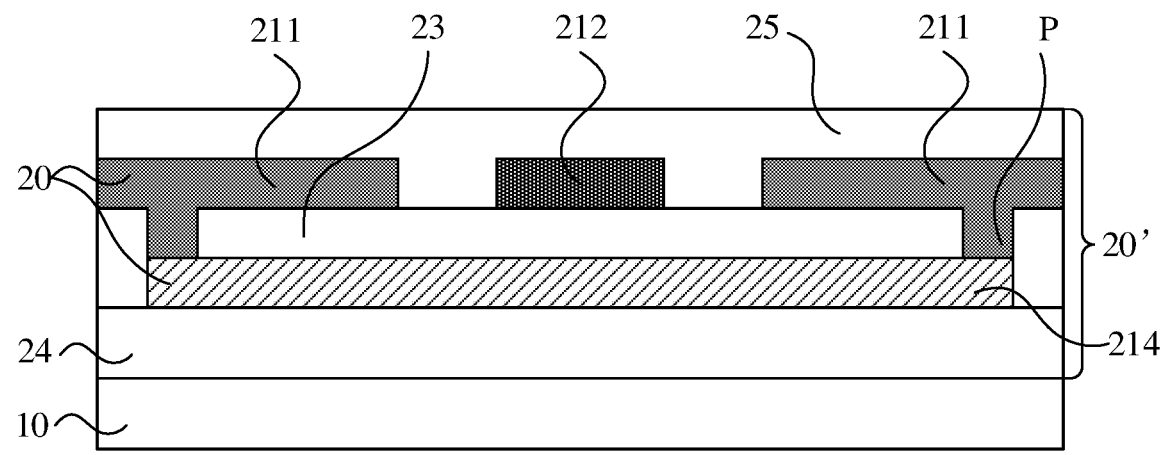
FIG. 7C is another sectional view of FIG. 7A at an EE position, in accordance with some other embodiments.

Referring to FIG. 7C, FIG. 7C is another cross-sectional view of FIG. 7A at an EE position in some other embodiments. FIG. 7C shows an embodiment in which the second connection electrodes 214 are located on the side of the second touch sub-electrode 211 proximate to the display panel 10. Two ends of the second connection electrode 214 may each be electrically connected to the second touch sub-electrode 211 through at least one via hole P.

For example, two ends of the second connection electrode 214 may each be electrically connected to the second touch sub-electrode 211 through two via holes P, which may improve reliability of the electrical connection between the second connection electrode 214 and the second touch sub-electrode 211, and reduce the equivalent resistance of the second connection electrode 214 and the second touch sub-electrode 211, thereby reducing the power consumption of the touch display panel and improving the display and touch effects.

With continued reference to FIGS. 7B and 7C, the touch panel 20' further includes an insulating layer 23, a buffer layer 24 and a protective layer 25. The insulating layer 23 is disposed between the second connection electrodes 214 and the second touch sub-electrodes 211, that is, the insulating layer 23 extends between the first touch structure layer 21 and the second touch structure layer 22. The insulating layer 23 can insulate the first touch structure layer 21 and the second touch structure layer 22. The buffer layer 24 is disposed on a side of the touch structure layer 20 proximate to the display panel 10, and the touch structure layer 20 and the buffer layer 24 may be in direct contact. The protective layer 25 is disposed on a side of the touch structure layer 20 away from the display panel 10. The protective layer 25 covers the touch structure layer 20 and is mainly used to protect the touch structure layer 20. The protective layer 25 is made of a material with high oxidation resistance, and can block external moisture and oxygen and avoid corrosion of the touch structure layer 20.

For example, referring to FIG. 3A, the insulating layer 23, the buffer layer 24 and the protective layer 25 may be equivalent to the second encapsulation layer 26 mentioned above. The material of the protective layer 25 may refer to the introduction of the second encapsulation layer 26 above. For example, it may be an inorganic insulating material such as silicon oxide, aluminum oxide or silicon nitride compound (SiNx). Of course, it may alternatively be an organic insulating material. The materials of the protective layer 25 and the insulating layer 23 may be the same or different.

As a possible design, the buffer layer 24 and the insulating layer 23 may have the same materials such as silicon nitride or polyimide, or may have different materials.

Figure 8A:
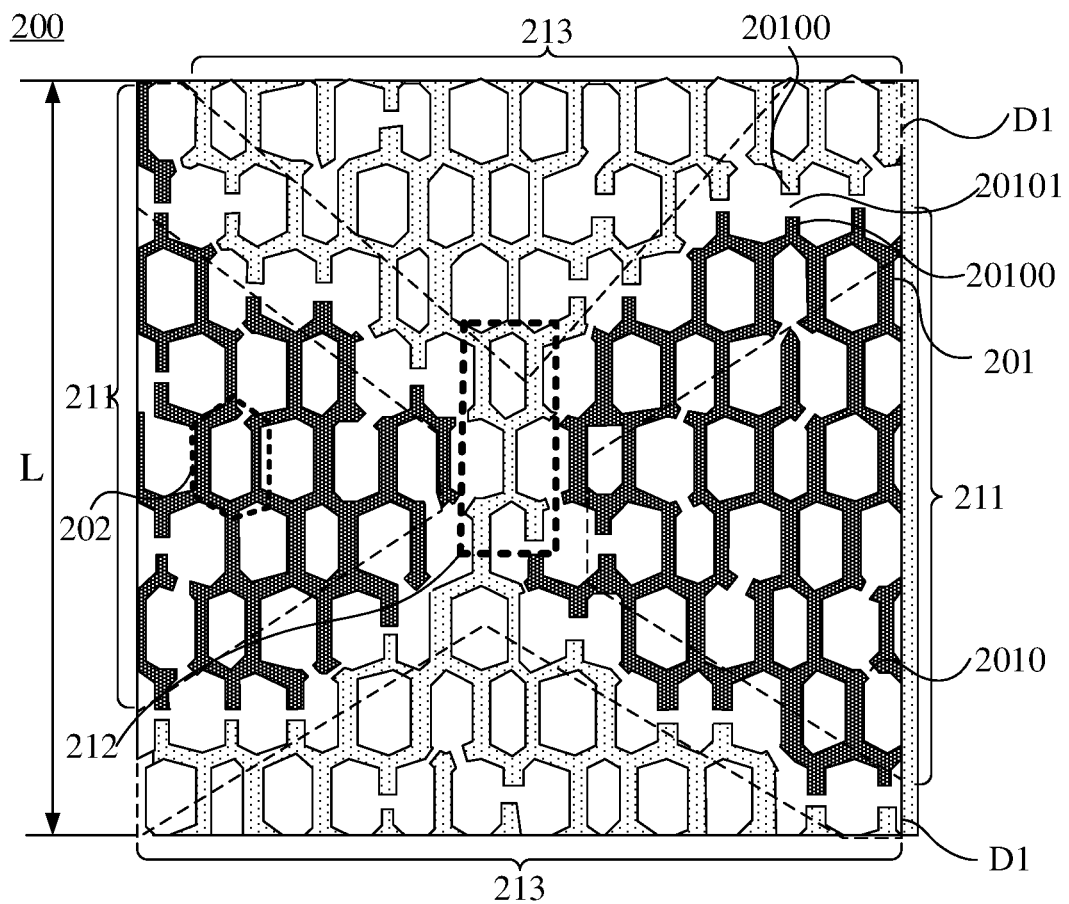
FIG. 8A is an enlarged structural diagram of a touch unit, in accordance with some embodiments of the present disclosure.

As shown in FIG. 7A, each first touch electrode 210 and each second touch electrode 220 are insulated and cross each other and form a plurality of touch units 200 at the cross positions. Each touch unit 200 includes a portion of each of two first touch sub-electrodes connected at a cross position and at least a portion of each of two second touch sub-electrodes connected at the cross position. As shown in FIG. 8A, FIG. 8A shows an enlarged structural diagram of a touch unit 200. It can be seen from FIG. 8A that the plurality of first touch sub-electrodes 213, the plurality of first connection electrodes 212, the plurality of second touch sub-electrodes 211 and the plurality of second connection electrodes 214 are composed of the plurality of touch lines. Each touch unit 200 includes a half region of each of two adjacent first touch sub-electrodes 213 and a half region of each of two adjacent second touch sub-electrodes 211, that is, each touch unit 200 averagely includes a region of one first touch sub-electrode 213 and a region of one second touch sub-electrode 211. The cross position in each touch unit 200 (i.e., a cross position of the first connection electrode 212 and the second connection electrode 214) becomes a reference point for coordinates calculation. When a finger touches the touch display apparatus, the coupling between a first touch sub-electrode 213 and a second touch sub-electrode 211 that are near a touch point may be affected, so that the mutual capacitance between the two electrodes changes. The touch sensing signal changes according to the change amounts in capacitance of the touch screen, and thus the coordinates of each touch point may be calculated based on the reference point. For example, an area of each touch unit 200 is equivalent to an area of the human finger in contact with the touch display panel 100, an excessively large area of the touch unit 200 may cause a touch blind spot on the panel, and an excessively small area of the touch unit 200 may cause an accidental touch signal.

For example, an average side length of each touch unit 200 is L, and L is in a range of 3.5 mm to 5 mm, inclusive. For example, L is 4 mm. Since a diameter of a region of a human finger in contact with the touch display panel 100 is about 4 mm. The average side length of each touch unit 200 is the same as an average diagonal length of each first touch sub-electrode 213 and an average diagonal length of each second touch sub-electrode 211, and is also the same as a center distance of adjacent first touch sub-electrodes 213 and a center distance of adjacent second touch sub-electrodes 211.

In some embodiments, as shown in FIG. 8A, portions of a plurality of touch lines 201 located in a boundary region D1 between a first touch sub-electrode 213 and a second touch sub-electrode 211 that are adjacent are provided with separation breaks 20101, and the breaks 2010 provided in the at least a part of touch lines 201 in the plurality of touch lines 201 include the separation breaks 20101.

The separation break 20101 divides the touch line 201 to which the separation break 20101 belongs into two touch sub-lines 20100. For example, each separation break 20101 is located in the middle of the touch line, and one of the two touch sub-lines 20100 belongs to the first touch sub-electrode 213, and the other belongs to the second touch sub-electrode 211, so that the adjacent first touch sub-electrode 213 and second touch sub-electrode 211 are insulated from each other.

It can be understood that the touch sub-line 20100 here may be a part of the first touch line, a part of the second touch line or a part of the third touch line, that is, the separation break 20101 divides the touch line 201 into two first touch lines, two second touch lines or two third touch lines.

The mutual insulation between the first touch sub-electrode 213 and the second touch sub-electrode 211 provided by at least one embodiment of the present disclosure is achieved through the breaks 2010. Compared with the insulation achieved by providing dummy electrodes, an area of the touch electrodes may increase, the density of the touch electrodes may increase, and thus the touch sensitivity may be improved.

In some embodiments, the number of breaks 2010, located in the boundary region D1 between the first touch sub-electrode 213 and the second touch sub-electrode 211 that are adjacent, in the plurality of touch lines 201 is greater than the number of breaks 2010, located in a non-boundary region, in the plurality of touch lines 201. The plurality of touch lines 201 include a plurality of first touch lines 2011, a plurality of second touch lines 2012 and a plurality of third touch lines 2013. The non-boundary region is a region other than the boundary region D1 in a region where the plurality of touch lines 201 are located.

It will be noted that the boundary region D1 between the first touch sub-electrode 213 and the second touch sub-electrode 211 that are adjacent refers to a region where the first touch sub-electrode 213 and the second touch sub-electrode 211 are insulated from each other, while a non-insulated region belongs to the non-boundary region. For example, in a touch unit 200, as shown in FIGS. 8A and 8B, the boundary region D1 refers to a region located at diagonal positions of the touch unit 200, and the non-boundary region refers to other regions in the touch unit 200 other than the boundary region D1.

Figure 8B:
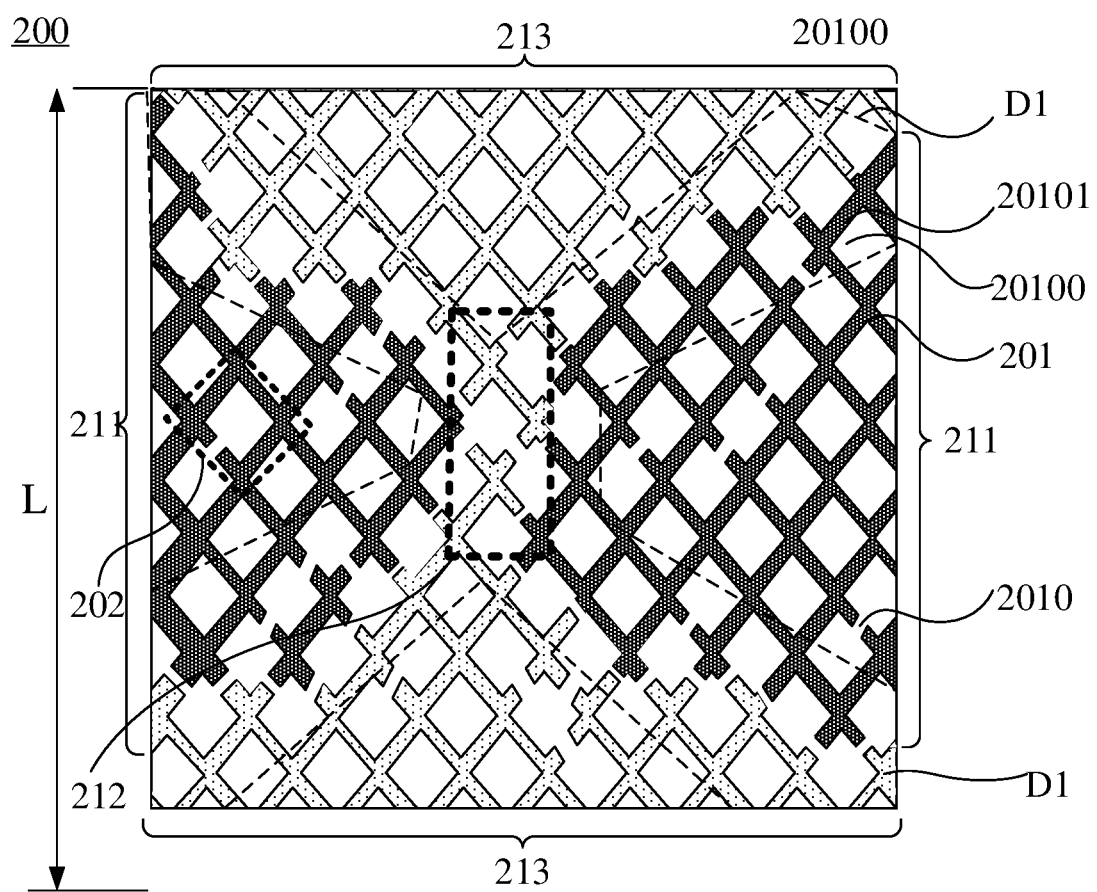
FIG. 8B is another enlarged structural diagram of a touch unit, in accordance with some embodiments of the present disclosure.

For example, with continued reference to FIGS. 8A and 8B, in the boundary region D1, in a plurality of touch meshes 202 defined by a plurality of first touch lines, a plurality of second touch lines and a plurality of third touch lines, the number of breaks provided in each touch mesh 202 is 2, 3 or 4; and in the non-boundary region, in a plurality of touch meshes 202 defined by a plurality of first touch lines, a plurality of second touch lines and a plurality of third touch lines, the number of breaks provided in each touch mesh 202 is 0, 1 or 2. Therefore, the total number of breaks 2010 provided in the plurality of touch meshes 202 located in the boundary region D1 is greater than the total number of breaks 2010 provided in the plurality of touch meshes 202 located in the non-boundary region.

In some embodiments, in a plurality of touch meshes 202 defined by the plurality of touch lines 201, an orthographic projection of each touch mesh 202 on the touch display panel is in a shape of a hexagon. The number of the breaks in each touch mesh 202 defined by multiple touch lines 201 located in the boundary region D1 between the first touch sub-electrode 213 and the second touch sub-electrode 211 that are adjacent is 2, 3 or 4, and the number of the breaks in each touch mesh 202 defined by multiple touch lines 201 located in the non-boundary region is 0, 1 or 2.

For example, as shown in FIG. 8A, in the plurality of touch meshes 202 defined by the plurality of touch lines 201, the orthographic projection of each touch mesh 202 on the touch display panel is in the shape of the hexagon. In the boundary region D1, in a plurality of touch meshes 202 defined by a plurality of first touch lines, a plurality of second touch lines and a plurality of third touch lines, the number of the breaks provided in each touch mesh 202 is 2, 3 or 4; and in the non-boundary region, in a plurality of touch meshes 202 defined by a plurality of first touch lines, a plurality of second touch lines and a plurality of third touch lines, the number of the breaks provided in each touch mesh 202 is 0, 1 or 2. Therefore, the total number of breaks 2010 provided in the plurality of touch meshes 202 located in the boundary region D1 is greater than the total number of breaks 2010 provided in the plurality of touch meshes 202 located in the non-boundary region.

In some embodiments, in a plurality of touch meshes 202 defined by the plurality of touch lines 201, an orthographic projection of each touch mesh 202 on the touch display panel is in a shape of a quadrilateral. The number of the breaks in each touch mesh defined by multiple touch lines 201 located in the boundary region D1 between the first touch sub-electrode 213 and the second touch sub-electrode 211 that are adjacent is 2 or 3, and the number of the breaks in each touch mesh 202 defined by multiple touch lines 201 located in the non-boundary region is 0, 1 or 2.

For example, as shown in FIG. 8B, in the plurality of touch meshes 202 defined by the plurality of touch lines 201, the orthographic projection of each touch mesh 202 on the touch display panel is in the shape of the quadrilateral. In the boundary region D1, in a plurality of touch meshes 202 defined by a plurality of first touch lines, a plurality of second touch lines and a plurality of third touch lines, the number of the breaks provided in each touch mesh 202 is 2 or 3; and in the non-boundary region, in a plurality of touch meshes 202 defined by a plurality of first touch lines, a plurality of second touch lines and a plurality of third touch lines, the number of the breaks provided in each touch mesh 202 is 0, 1 or 2. Therefore, the total number of breaks 2010 provided in the plurality of touch meshes 202 located in the boundary region D1 is greater than the total number of breaks 2010 provided in the plurality of touch meshes 202 located in the non-boundary region.

Figure 9A:
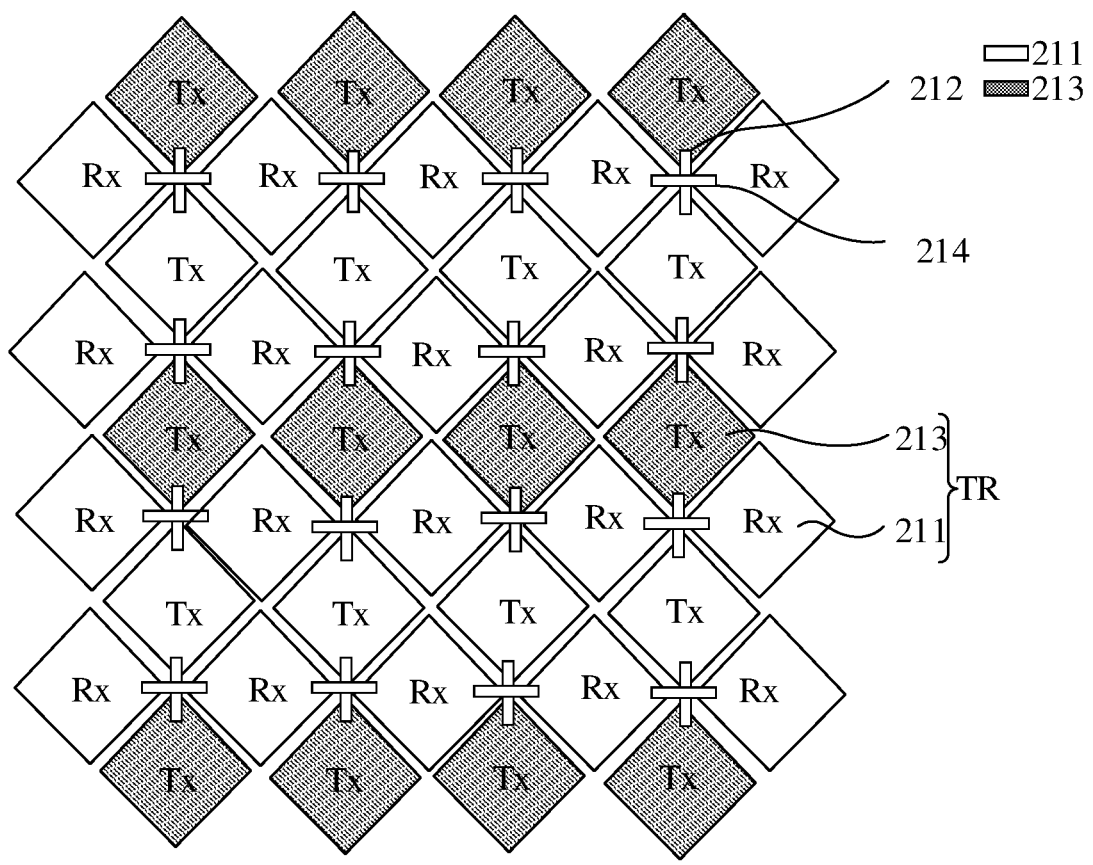
FIG. 9A is a structural diagram of a touch material provision in a third region, in accordance with some embodiments of the present disclosure.
Figure 9B:
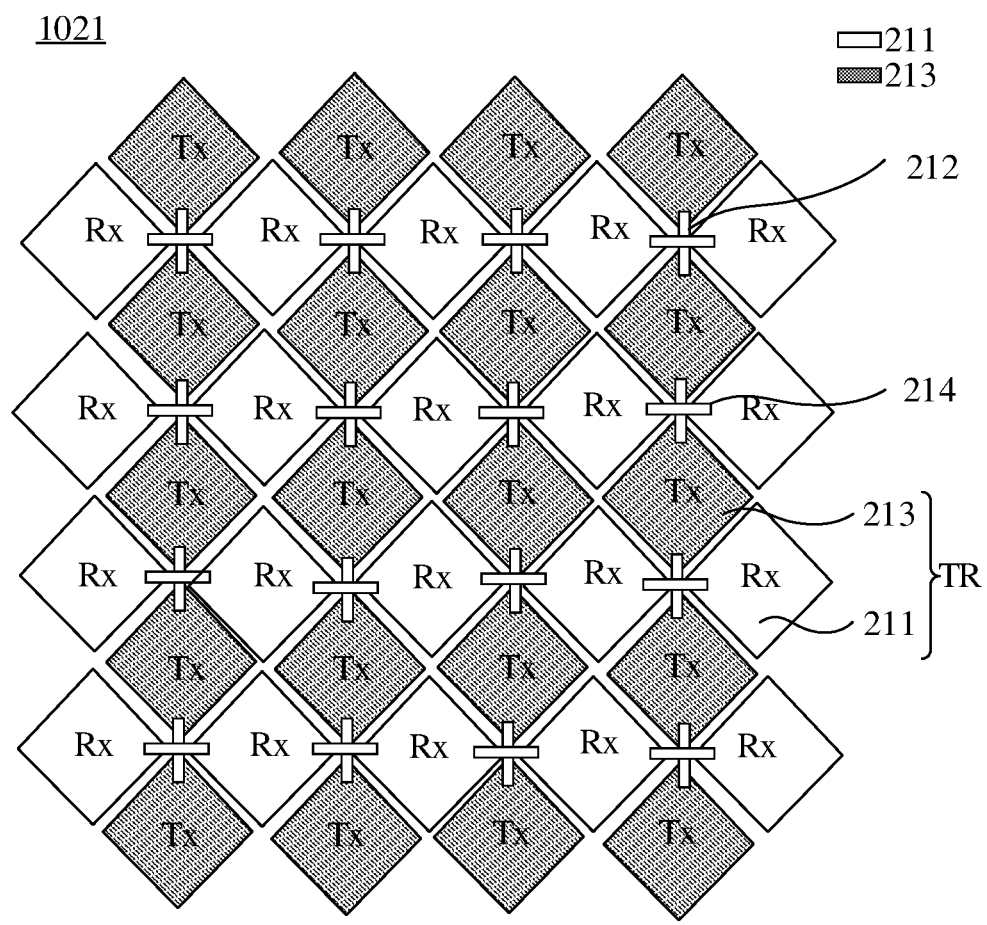
FIG. 9B is a structural diagram of a touch material provision in a second region, in accordance with some embodiments of the present disclosure.
Figure 9C:
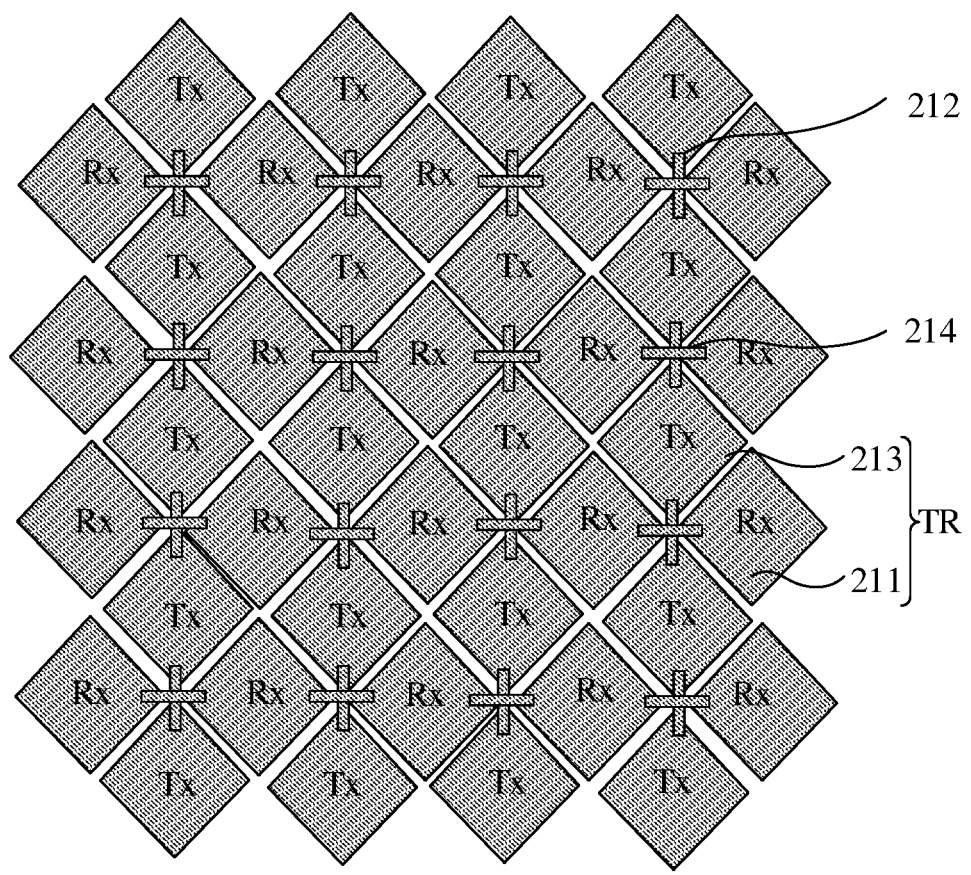
FIG. 9C is a structural diagram of a touch material provision in a first region, in accordance with some embodiments of the present disclosure.

In some embodiments, as shown in FIGS. 9A to 9C, the touch structure layer 20 includes a plurality of touch sub-electrodes TR, at least part of touch sub-electrodes TR in the plurality of touch sub-electrodes TR are metal touch sub-electrodes, and the other part of touch sub-electrodes TR are transparent conductive touch sub-electrodes. A ratio of the number of the transparent conductive touch sub-electrodes in the first region 101 to the number of the plurality of touch sub-electrodes TR is less than a ratio of the number of the transparent conductive touch sub-electrodes in the second region 1021 to the number of the plurality of touch sub-electrodes TR, and the ratio of the number of the transparent conductive touch sub-electrodes in the second region 1021 to the number of the plurality of touch sub-electrodes TR is less than a ratio of the number of the transparent conductive touch sub-electrodes in the third region 1022 to the number of the plurality of touch sub-electrodes TR.

It will be noted that in FIGS. 9A to 9C, the touch sub-electrodes TR with pattern filling represent metal touch sub-electrodes, and the touch sub-electrodes TR without pattern filling represent transparent conductive touch sub-electrodes.

In some embodiments, the transmittance of the transparent conductive touch sub-electrodes is higher than that of the metal touch sub-electrodes. Therefore, in a region, the lager the ratio of the number of the transparent conductive touch sub-electrodes to the number of the plurality of touch sub-electrodes TR, the higher the overall transmittance of the region. The transmittance is a ratio of an incident amount of light, passing through multiple touch lines 201 to be irradiated onto the anode layer, in the incident light from the side of the touch structure layer 20 in a region to a total incident amount.

For example, the transmittance of the first region 101 is less than the transmittance of the second region 1021, and the transmittance of the second region 1021 is less than the transmittance of the third region 1022. The ratio of the metal touch sub-electrodes to the transparent conductive touch sub-electrode are set to change the transmittance of each region, so as to enhance the reflectivity. As a result, the reflectivity of the first region 101, the reflectivity of the second region 1021 and the reflectivity of the third region 1022 are equal, and ultimately the problem of the optical defect in the regions may be improved, thereby enhancing the display effect of the touch display panel 100.

Figure 10A:
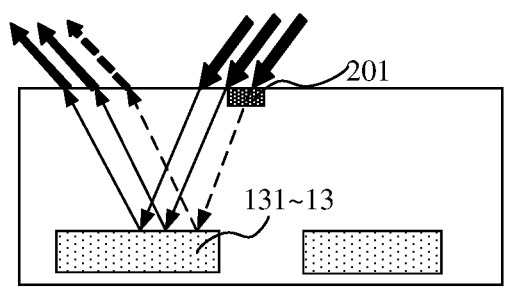
FIG. 10A is a schematic diagram of reflection of light through a metal touch sub-electrode.
Figure 10B:
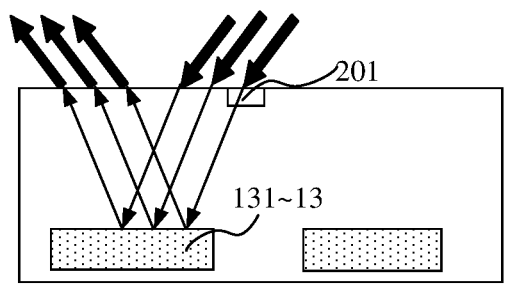
FIG. 10B is a schematic diagram of reflection of light through a transparent conductive touch sub-electrode.

As shown in FIGS. 10A and 10B, FIG. 10A shows a schematic diagram of the path of light passing through the metal touch sub-electrode, and FIG. 10B shows a schematic diagram of the path of light passing through the transparent conductive touch sub-electrode. It can be seen that the transparent conductive touch sub-electrode has a higher transmittance. Most light incident from the outside may pass through the transparent conductive touch sub-electrode to be incident on the anode layer 131, thereby improving the reflectivity of the light.

In some embodiments, in the third region 1022, the second region 1021 and the first region 101, ratios of the numbers of the metal touch sub-electrodes to the numbers of the transparent conductive touch sub-electrodes gradually increase.

For example, as shown in FIG. 9A, FIG. 9A is a partial view of the third region 1022. The metal touch sub-electrodes account for a smaller proportion than the transparent conductive touch sub-electrodes. Therefore, the ratio of the number of the metal touch sub-electrodes to the number of the transparent conductive touch sub-electrodes is relatively small and less than 1. For example, the ratio of the number of the metal touch sub-electrodes to the number of the transparent conductive touch sub-electrodes is ⅓.

For example, as shown in FIG. 9B, FIG. 9B is a partial view of the second region 1021. The metal touch sub-electrodes account for a comparable proportion to the transparent conductive touch sub-electrodes. Therefore, the ratio of the number of the metal touch sub-electrodes to the number of the transparent conductive touch sub-electrodes is close to 1.

For example, as shown in FIG. 9C, FIG. 9C is a partial view of the first region 101. The metal touch sub-electrodes account for a larger proportion than the transparent conductive touch sub-electrodes. Therefore, the ratio of the number of the metal touch sub-electrodes to the number of the transparent conductive touch sub-electrodes is relatively large and greater than 1.

In some embodiments, a plurality of touch sub-electrodes TR in the first region 101 are all metal touch sub-electrodes.

For example, the above provision may change the transmittance of each region by changing the ratio of the metal touch sub-electrodes to the transparent conductive touch sub-electrodes, so as to enhance the reflectivity. As a result, the reflectivity of the first region 101, the reflectivity of the second region 1021 and the reflectivity of the third region 1022 are equal, and ultimately the problem of the optical defect in the regions may be improved.

Beneficial effects of the touch display apparatus 1000 in the above embodiments of the present disclosure are the same as beneficial effects of the touch display panel 100 in some of the above embodiments, and details are not repeated here.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch display panel, comprising:
a display panel, the display panel including an anode layer; and
a touch panel disposed on a side of the display panel; the touch panel including a touch structure layer; the touch structure layer including a plurality of touch lines, and the plurality of touch lines defining a plurality of touch meshes; wherein
the touch display panel comprises a first region and a second region; the plurality of touch lines includes a plurality of first touch lines located in the first region and a plurality of second touch lines located in the second region; a line width of at least one first touch line in the plurality of first touch lines is smaller than a line width of at least one second touch line in the plurality of second touch lines; and
reflectivity of the first region is equal to reflectivity of the second region; and a reflectivity is a ratio of light, which is in an incident light from a side of the touch structure layer and irradiated onto the anode layer through the plurality of touch lines, and is further reflected back to the touch structure layer by the anode layer, to the incident light.

2. The touch display panel according to claim 1, wherein the touch display panel further comprises a third region; the plurality of touch lines further include a plurality of third touch lines located in the third region; a line width of at least one third touch line in the plurality of third touch lines is larger than the line width of the at least one second touch line in the plurality of second touch lines; and
reflectivity of the third region is equal to the reflectivity of the first region and the reflectivity of the second region.

3. The touch display panel according to claim 2, wherein at least a part of touch lines in the plurality of touch lines are provided with breaks therein; a break rate of the first region is less than a break rate of the second region, and the break rate of the second region is less than a break rate of the third region; and
a break rate is a ratio of a number of touch lines with breaks in multiple touch lines in a region to a number of all touch lines in the region.

4. The touch display panel according to claim 3, wherein a density of breaks in the first region is less than a density of breaks in the second region, and the density of the breaks in the second region is less than a density of breaks in the third region;
and/or
a size of a break in the first region is smaller than a size of a break in the second region, and the size of the break in the second region is smaller than a size of a break in the third region.

5. The touch display panel according to claim 3, wherein the break rate of the first region is 20%; the break rate of the second region is in a range of 23% to 27%, inclusive; and the break rate of the third region is in a range of 28% to 32%, inclusive.

6. The touch display panel according to claim 2, wherein at least a part of touch lines in the plurality of touch lines are metal touch lines, and another part of touch lines are transparent conductive touch lines; and
a ratio of a number of transparent conductive touch lines in the first region to a number of the plurality of first touch lines is less than a ratio of a number of transparent conductive touch lines in the second region to a number of the plurality of second touch lines, and the ratio of the number of the transparent conductive touch lines in the second region to the number of the plurality of second touch lines is less than a ratio of a number of transparent conductive touch lines in the third region to a number of the plurality of third touch lines.

7. The touch display panel according to claim 1, wherein the first region is a touch region, and the second region and the third region are a non-touch region; in the plurality of touch lines, the plurality of first touch lines located in the first region are disconnected from the plurality of second touch lines located in the second region and the plurality of third touch lines located in the third region.

8. The touch display panel according to claim 7, wherein a break rate of the first region is 20%; a break rate of the second region in the non-touch region is in a range of 25% to 40%, inclusive; and a break rate of the third region in the non-touch region is in a range of 30% to 50%, inclusive.

9. The touch display panel according to claim 1, wherein at least a part of touch lines in the plurality of touch lines are provided with openings therein; an opening rate of the first region is less than an opening rate of the second region, and the opening rate of the second region is less than an opening rate of the third region; and
an opening rate is a ratio of a number of touch lines with openings in multiple touch lines in a region to a number of all touch lines in the region.

10. The touch display panel according to claim 9, wherein a density of openings in the first region is less than a density of openings in the second region, and the density of the openings in the second region is less than a density of openings in the third region;
and/or
a size of an opening in the first region is smaller than a size of an opening in the second region, and the size of the opening in the second region is smaller than a size of an opening in the third region.

11. The touch display panel according to claim 10, wherein
the opening rate of the first region is 20%; the opening rate of the second region is in a range of 23% to 27%, inclusive; and the opening rate of the third region is in a range of 28% to 32%, inclusive.

12. The touch display panel according to claim 9, wherein an orthogonal projection of an opening on the display panel is in a shape of a circle, a rectangle or an ellipse.

13. The touch display panel according to claim 1, wherein the touch structure layer includes a first touch structure layer and a second touch structure layer; and the touch structure layer includes a plurality of touch sub-electrodes;
the first touch structure layer includes a plurality of first touch sub-electrodes and a plurality of first connection electrodes arranged in a first direction, and the plurality of first touch sub-electrodes and the plurality of first connection electrodes are alternately distributed one by one and electrically connected in sequence to constitute a first touch electrode extending in the first direction; and
the first touch structure layer further includes a plurality of second touch sub-electrodes arranged sequentially in a second direction, the second touch structure layer includes a plurality of second connection electrodes arranged in the second direction, and the plurality of second touch sub-electrodes and the plurality of second connection electrodes are alternately distributed one by one and electrically connected in sequence to constitute a second touch electrode extending in the second direction; wherein the first direction intersects the second direction; the plurality of first touch sub-electrodes, the plurality of first connection electrodes, the plurality of second touch sub-electrodes and the plurality of second connection electrodes are composed of the plurality of touch lines.

14. The touch display panel according to claim 13, wherein portions of the plurality of touch lines located in a boundary region between a first touch sub-electrode and a second touch sub-electrode that are adjacent are provided with separation breaks therein, at least a part of touch lines in the plurality of touch lines are provided with breaks therein, and the breaks provided in the at least a part of touch lines in the plurality of touch lines include the separation breaks; and a separation break divides a touch line to which the separation break belongs into two touch sub-lines; one of the two touch sub-lines belongs to the first touch sub-electrode, and another thereof belongs to the second touch sub-electrode, so that the first touch sub-electrode and the second touch sub-electrode that are adjacent are insulated from each other.

15. The touch display panel according to claim 14, wherein a number of breaks, located in the boundary region between the first touch sub-electrode and the second touch sub-electrode that are adjacent, in the plurality of touch lines is greater than a number of breaks, located in a non-boundary region, in the plurality of touch lines; wherein the non-boundary region is a region, other than the boundary region, in a region where the plurality of touch lines are located.

16. The touch display panel according to claim 15, wherein in the plurality of touch meshes defined by the plurality of touch lines, an orthographic projection of each touch mesh on the display panel is in a shape of a hexagon; a number of breaks in each touch mesh defined by multiple touch lines located in the boundary region between the first touch sub-electrode and the second touch sub-electrode that are adjacent is 2, 3 or 4, and a number of breaks in each touch mesh defined by multiple touch lines located in the non-boundary region is 0, 1 or 2.

17. The touch display panel according to claim 15, wherein in the plurality of touch meshes defined by the plurality of touch lines, an orthographic projection of each touch mesh on the display panel is in a shape of a quadrilateral; a number of breaks in each touch mesh defined by multiple touch lines located in the boundary region between the first touch sub-electrode and the second touch sub-electrode that are adjacent is 2 or 3, and a number of breaks in each touch mesh defined by multiple touch lines located in the non-boundary region is 0, 1 or 2.

18. The touch display panel according to claim 13, wherein the touch display panel further comprises a third region; at least a part of touch sub-electrodes in the plurality of touch sub-electrodes are metal touch sub-electrodes, and another part of touch sub-electrodes are transparent conductive touch sub-electrodes; and a ratio of a number of transparent conductive touch sub-electrodes in the first region to a number of the plurality of touch sub-electrodes is less than a ratio of a number of transparent conductive touch sub-electrodes in the second region to the number of the plurality of touch sub-electrodes, and the ratio of the number of the transparent conductive touch sub-electrodes in the second region to the number of the plurality of touch sub-electrodes is less than a ratio of a number of transparent conductive touch sub-electrodes in the third region to the number of the plurality of touch sub-electrodes.

19. The touch display panel according to claim 18, wherein multiple touch sub-electrodes in the first region are all metal touch sub-electrodes.

20. A touch display apparatus, comprising the touch display panel according to claim 1.

* * * * *

UNITED STATES PATENT AND TRADEMARK OFFICE
CERTIFICATE OF CORRECTION

| | |
|---|---|
| PATENT NO. | : 12,373,073 B2 |
| APPLICATION NO. | : 18/579941 |
| DATED | : July 29, 2025 |
| INVENTOR(S) | : Qian Jia et al. |

Page 1 of 1

It is certified that error appears in the above-identified patent and that said Letters Patent is hereby corrected as shown below:

In the Claims

Column 28, Line 8, Claim 7, delete "claim 1," and insert -- claim 2, --

Signed and Sealed this
Thirteenth Day of January, 2026

John A. Squires
*Director of the United States Patent and Trademark Office*